(12) United States Patent
Wang et al.

(10) Patent No.: US 11,754,870 B2
(45) Date of Patent: Sep. 12, 2023

(54) LIQUID CRYSTAL POLARIZATION HOLOGRAM DEVICE COMPRISING AN OPTIC AXIS WITH A SPATIALLY VARYING ORIENTATION AND COMPENSATED WAVY STRUCTURES

(71) Applicant: Meta Platforms Technologies, LLC, Menlo Park, CA (US)

(72) Inventors: Junren Wang, Kirkland, WA (US); Yuge Huang, Oviedo, FL (US); Yun-Han Lee, Redmond, WA (US); Lu Lu, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/944,183

(22) Filed: Sep. 13, 2022

(65) Prior Publication Data

US 2023/0144920 A1     May 11, 2023

Related U.S. Application Data

(60) Provisional application No. 63/276,793, filed on Nov. 8, 2021.

(51) Int. Cl.
    *G02F 1/1334*      (2006.01)
    *G02F 1/1337*      (2006.01)
    *G02F 1/13363*     (2006.01)

(52) U.S. Cl.
    CPC ...... *G02F 1/13342* (2013.01); *G02F 1/13363* (2013.01); *G02F 1/133707* (2013.01)

(58) Field of Classification Search
    CPC ............. G02F 1/13342; G02F 2203/07; G02F 2203/12
See application file for complete search history.

(56) References Cited

U.S. PATENT DOCUMENTS

| | | | |
|---|---|---|---|
| 2007/0053028 A1 | 3/2007 | Ezra | |
| 2010/0149311 A1* | 6/2010 | Kroll | G03H 1/0808 348/E13.001 |
| 2010/0157399 A1* | 6/2010 | Kroll | G03H 1/02 359/11 |
| 2011/0027494 A1 | 2/2011 | Tan et al. | |

(Continued)

FOREIGN PATENT DOCUMENTS

| | | | |
|---|---|---|---|
| CN | 102455522 B | * 11/2014 | ........... G02B 27/286 |
| WO | 2006007742 A1 | 1/2006 | |

OTHER PUBLICATIONS

International Search Report and Written Opinion for International Application No. PCT/US2022/049276, dated Mar. 27, 2023, 10 pages.

(Continued)

*Primary Examiner* — Paul C Lee
(74) *Attorney, Agent, or Firm* — MILLBURN IP PLLC

(57) ABSTRACT

A device is provided. The device includes a polarization hologram polymer layer having a wavy surface, an optic axis of the polarization hologram polymer layer being configured with a spatially varying orientation in a first predetermined in-plane direction. The device also includes a compensation layer disposed at the wavy surface of the polarization hologram polymer layer and configured to compensate for the wavy surface in shape.

20 Claims, 23 Drawing Sheets

(56) References Cited

U.S. PATENT DOCUMENTS

2017/0010488 A1    1/2017  Klug et al.
2020/0096689 A1*   3/2020  Tam .................... G02B 5/3016
2020/0209691 A1*   7/2020  Li ........................ G02F 1/0136

OTHER PUBLICATIONS

Ono H., et al., "Migration Induced Reorientation and Anisotropic Grating Formation in Photoreactive Polymer Liquid Crystals," Optical Materials, vol. 30, No. 2, Jan. 8, 2007, 7 pages.

* cited by examiner

1000

| Providing a polarization hologram polymer layer having a wavy surface and an optic axis configured with a spatially varying orientation in a first predetermined in-plane direction | ⌐1010 |

↓

| Forming a compensation layer over the wavy surface of the polarization hologram polymer layer to compensate for the wavy surface in shape | ⌐1020 |

```
┌─────────────────────────────────────────────────────────────┐
│ Determining one or more relationships between an average    │
│ height of a wavy surface of a testing polarization hologram │──1060
│ polymer layer and one or more polymerization parameters     │
└─────────────────────────────────────────────────────────────┘
                              │
                              ▼
┌─────────────────────────────────────────────────────────────┐
│ Determining one or more values of the one or more           │
│ polymerization parameters that render the average height of │──1070
│ the wavy surface of the testing polarization hologram       │
│ polymer layer to be a predetermined average height          │
└─────────────────────────────────────────────────────────────┘
                              │
                              ▼
┌─────────────────────────────────────────────────────────────┐
│ Fabricating a final polarization hologram polymer layer     │
│ using a polymerization process based on the determined one  │──1080
│ or more values of the one or more polymerization parameters │
└─────────────────────────────────────────────────────────────┘
```

FIG. 9B

LIQUID CRYSTAL POLARIZATION HOLOGRAM DEVICE COMPRISING AN OPTIC AXIS WITH A SPATIALLY VARYING ORIENTATION AND COMPENSATED WAVY STRUCTURES

CROSS REFERENCE TO RELATED APPLICATION

This application claims the benefit of priority to U.S. Provisional Application No. 63/276,793, filed on Nov. 8, 2021. The content of the above-mentioned application is incorporated herein by reference in its entirety.

TECHNICAL FIELD

The present disclosure generally relates to devices and, more specifically, to a liquid crystal polarization hologram device with compensated wavy structures.

BACKGROUND

Liquid crystal polarization holograms ("LCPHs") refer to the intersection of liquid crystal devices and polarization holograms. Liquid crystal displays ("LCDs"), having grown to a trillion dollar industry over the past decades, are the most successful example of liquid crystal devices. The LCD industry has made tremendous investments to scale manufacturing, from the low end G2.5 manufacturing line to the high end G10.5+ to meet the market demands for displays. However, the LCD industry has recently faced competition from organic light-emitting diodes ("OLED"), e-paper and other emerging display technologies, which has flattened the growth rate of LCD industry and has rendered significant early generation capacity redundant. This provides an opportunity to repurpose the LCD idle capacity and existing supply chain to manufacture novel LC optical devices characterized by their polarization holograms.

LCPHs have features such as small thickness (~1 um), light weight, compactness, large aperture, high efficiency, simple fabrication, etc. Thus, LCPHs have gained increasing interests in optical device and system applications, e.g., near-eye displays ("NEDs"), head-up displays ("HUDs"), head-mounted displays ("HMDs"), smart phones, laptops, televisions, or vehicles, etc. For example, LCPHs may be used for addressing accommodation-vergence conflict, enabling thin and highly efficient eye-tracking and depth sensing in space constrained optical systems, developing optical combiners for image formation, correcting chromatic aberrations for image resolution enhancement of refractive optical elements in compact optical systems, and improving the efficiency and reducing the size of optical systems.

SUMMARY OF THE DISCLOSURE

Consistent with an aspect of the present disclosure, a device is provided. The device includes a polarization hologram polymer layer having a wavy surface, an optic axis of the polarization hologram polymer layer being configured with a spatially varying orientation in a first predetermined in-plane direction. The device also includes a compensation layer disposed at the wavy surface of the polarization hologram polymer layer and configured to compensate for the wavy surface in shape.

Consistent with another aspect of the present disclosure, a method is provided. The method includes providing a polarization hologram polymer layer having a wavy surface and an optic axis configured with a spatially varying orientation in a first predetermined in-plane direction. The method includes forming a compensation layer over the wavy surface of the polarization hologram polymer layer to compensate for the wavy surface in shape.

Consistent with another aspect of the present disclosure, a method is provided. The method includes determining one or more relationships between an average height of a wavy surface of a testing polarization hologram polymer layer and one or more polymerization parameters, the testing polarization hologram polymer layer having an optic axis configured with a spatially varying orientation in a first predetermined in-plane direction. The method also includes determining one or more values of the one or more polymerization parameters that render the average height of the wavy surface of the testing polarization hologram polymer layer to be a predetermined average height. The method also includes fabricating a final polarization hologram polymer layer using a polymerization process based on the determined one or more values of the one or more polymerization parameters, the fabricated final polarization hologram polymer layer having a wavy surface with the predetermined average height.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings:

FIG. 9A is a flowchart illustrating a method for fabricating an LCPH element with compensated wavy structures, according to an embodiment of the present disclosure; and FIG. 9B is a flowchart illustrating a method for fabricating an LCPH element including wavy structures of a predefined height, according to an embodiment of the present disclosure.

DETAILED DESCRIPTION

Figure 1A:
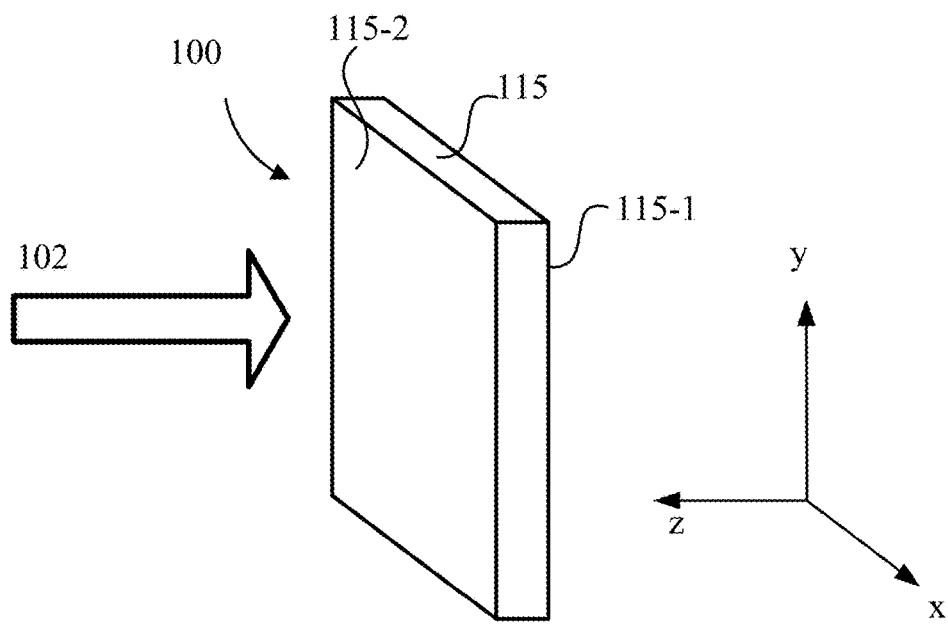
FIG. 1A schematically illustrates a three-dimensional ("3D") view of a liquid crystal polarization hologram ("LCPH") element, according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "film," "layer," "coating," or "plate" may include rigid or flexible, self-supporting or free-standing film, layer, coating, or plate, which may be disposed on a supporting substrate or between substrates. The terms "film," "layer," "coating," and "plate" may be interchangeable.

The phrases "in-plane direction," "in-plane orientation," "in-plane rotation," "in-plane alignment pattern," and "in-plane pitch" refer to a direction, an orientation, a rotation, an alignment pattern, and a pitch in a plane of a film or a layer (e.g., a surface plane of the film or layer, or a plane parallel to the surface plane of the film or layer), respectively. The term "out-of-plane direction" or "out-of-plane orientation" indicates a direction or orientation that is non-parallel to the plane of the film or layer (e.g., perpendicular to the surface plane of the film or layer, e.g., perpendicular to a plane parallel to the surface plane). For example, when an "in-plane" direction or orientation refers to a direction or orientation within a surface plane, an "out-of-plane" direction or orientation may refer to a thickness direction or orientation perpendicular to the surface plane, or a direction or orientation that is not parallel with the surface plane.

The term "orthogonal" as used in "orthogonal polarizations" or the term "orthogonally" as used in "orthogonally polarized" means that an inner product of two vectors representing the two polarizations is substantially zero. For example, two lights or beams with orthogonal polarizations (or two orthogonally polarized lights or beams) may be two linearly polarized lights (or beams) with two orthogonal polarization directions (e.g., an x-axis direction and a y-axis direction in a Cartesian coordinate system) or two circularly polarized lights with opposite handednesses (e.g., a left-handed circularly polarized light and a right-handed circularly polarized light).

In the present disclosure, an angle of a beam (e.g., a diffraction angle of a diffracted beam or an incidence angle of an incident beam) with respect to a normal of a surface can be defined as a positive angle or a negative angle, depending on the angular relationship between a propagating direction of the beam and the normal of the surface. For example, when the propagating direction of the beam is clockwise (or counter-clockwise) from the normal, the angle of the propagating direction may be defined as a positive angle, and when the propagating direction of the beam is counter-clockwise (or clockwise) from the normal, the angle of the propagating direction may be defined as a negative angle.

The wavelength ranges, spectra, or bands mentioned in the present disclosure are for illustrative purposes. The disclosed optical device, system, element, assembly, and method may be applied to a visible wavelength band, as well as other wavelength bands, such as an ultraviolet ("UV") wavelength band, an infrared ("IR") wavelength band, or a combination thereof. The term "substantially" or "primarily" used to modify an optical response action, such as transmit, reflect, diffract, block or the like that describes processing of a light means that a majority portion, including all, of a light is transmitted, reflected, diffracted, or blocked, etc. The majority portion may be a predetermined percentage (greater than 50%) of the entire light, such as 100%, 95%, 90%, 85%, 80%, etc., which may be determined based on specific application needs.

Among liquid crystal polarization hologram ("LCPH") elements, liquid crystal ("LC") based geometric phase ("GP") or Pancharatnam-Berry phase ("PBP") elements and polarization volume hologram ("PVH") elements have been extensively studied. A PBP element may modulate a circularly polarized light based on a phase profile provided through a geometric phase. A PBP element may split a linearly polarized light or an unpolarized light into two circularly polarized lights with opposite handednesses and symmetric deflecting directions. A PVH element may modulate a circularly polarized light based on Bragg diffraction. A PVH element may split a linearly polarized light or an unpolarized light into two circularly polarized lights with opposite handednesses or the same handedness. A PVH element may substantially forwardly or backwardly diffract one circularly polarized component while substantially transmit the other circularly polarized component of a linearly polarized light or an unpolarized light. Orientations of LC molecules in the PBP element and the PVH element may exhibit rotations in three-dimensions, and may have similar in-plane orientational patterns.

Figure 1B:
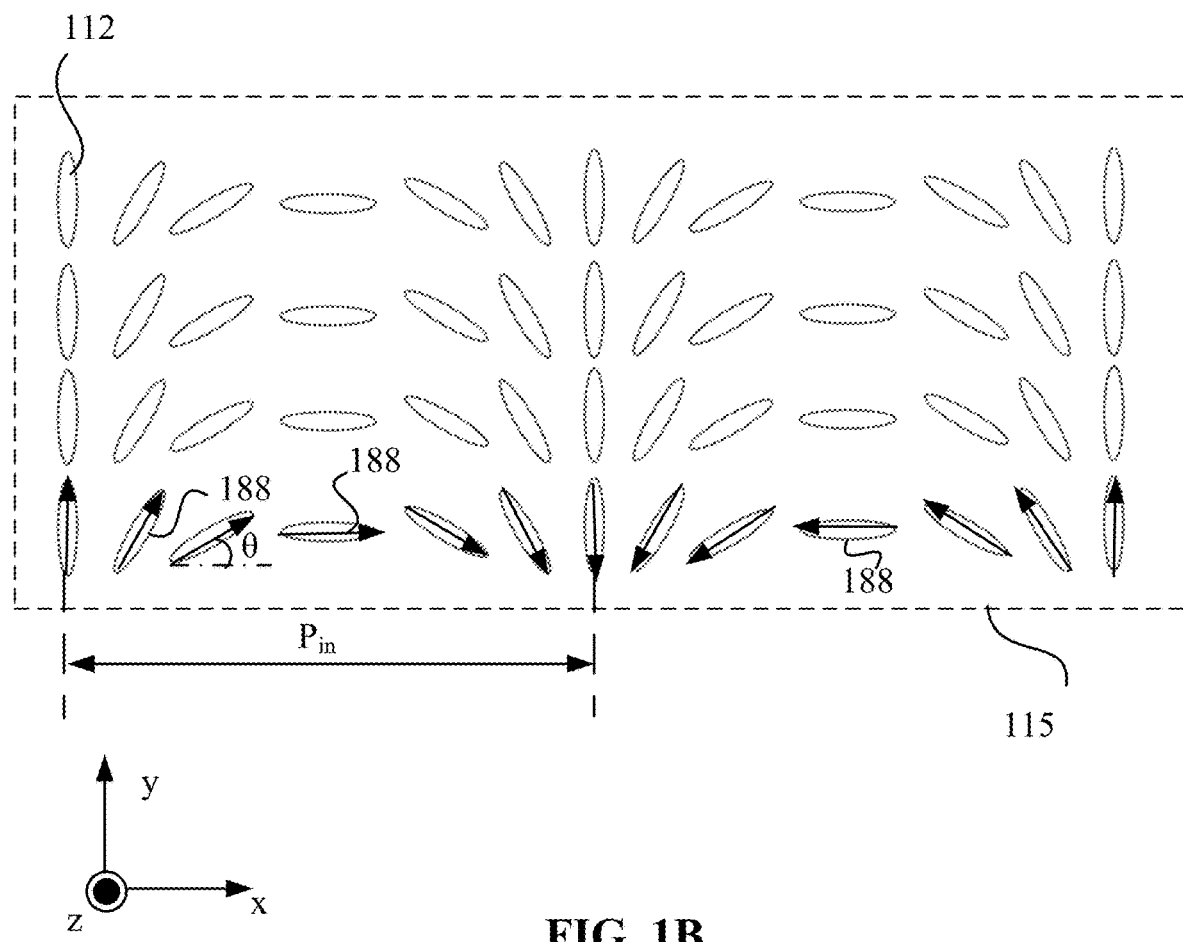
FIGS. 1B-1D schematically illustrate various views of a portion of the LCPH element shown in FIG. 1A, showing in-plane orientations of optically anisotropic molecules in the LCPH element, according to various embodiments of the present disclosure.
Figure 1C:
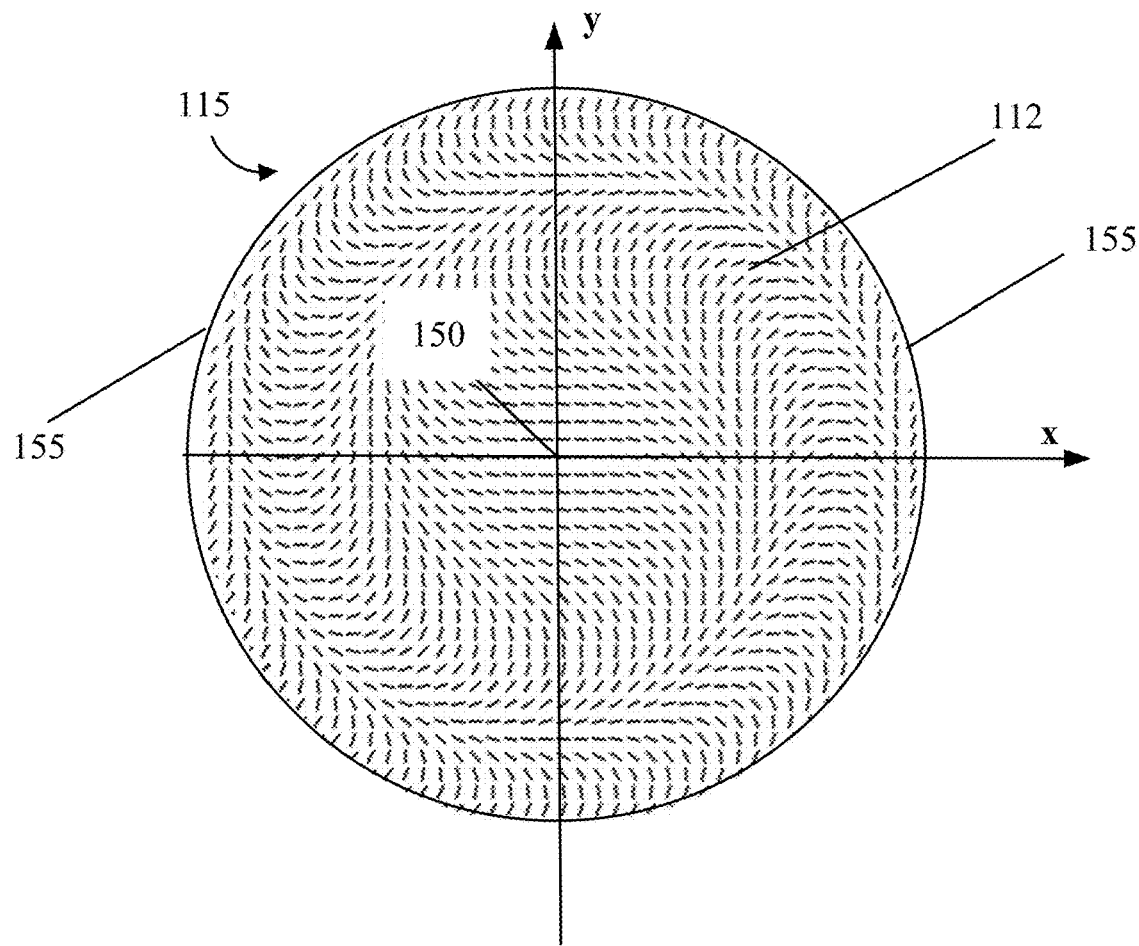
Figure 1D:
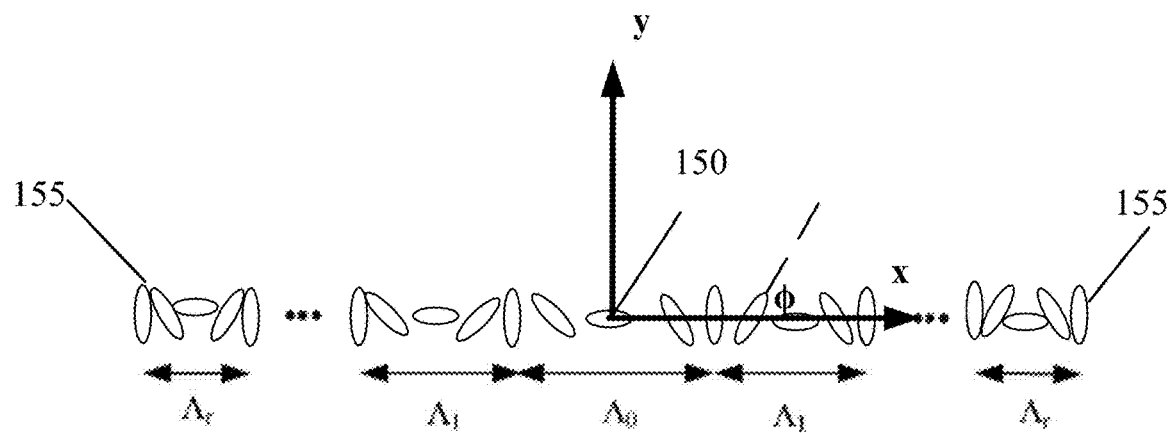

FIG. 1A illustrates a schematic three-dimensional ("3D") view of a liquid crystal polarization hologram ("LCPH") device 100 with a light 102 incident onto the LCPH element 100 along a −z-axis, according to an embodiment of the present disclosure. FIGS. 1B-1D schematically illustrate various views of a portion of the LCPH element 100 shown in FIG. 1A, showing in-plane orientations of optically anisotropic molecules in the LCPH element 100, according to various embodiments of the present disclosure. FIGS.

1E-1H schematically illustrate various views of a portion of the LCPH element 100 shown in FIG. 1A, showing out-of-plane orientations of optically anisotropic molecules in the LCPH element 100, according to various embodiments of the present disclosure.

As shown in FIG. 1A, although the LCPH element 100 is shown as a rectangular plate shape for illustrative purposes, the LCPH element 100 may have any suitable shape, such as a circular shape. In some embodiments, one or both surfaces along the light propagating path of the light 102 may have curved shapes. In some embodiments, the LCPH element 100 may include a thin layer (or film) 115 of one or more birefringent materials with intrinsic or induced (e.g., photo-induced) optical anisotropy, such as liquid crystals, liquid crystal polymers, amorphous polymers. Such a thin layer 115 may also be referred to as a birefringent medium layer (or film) an LCPH layer (or film) 115.

In some embodiments, the birefringent medium layer 115 may be a polarization hologram layer configured to provide a polarization selective optical response, e.g., providing different optical responses to input lights with orthogonal polarizations. The polarization hologram layer described herein may be fabricated based on various methods, such as holographic interference, laser direct writing, ink-jet printing, and various other forms of lithography. Thus, a "hologram" described herein is not limited to fabrication by holographic interference, or "holography." In some embodiments, the birefringent medium layer 115 may be a polymer layer (or film), e.g., polarization hologram polymer layer. For example, in some embodiments, the birefringent medium layer 115 may be a liquid crystal polymer ("LCP") layer. In some embodiments, the LCP layer may include polymerized (or cross-linked) LCs, polymer-stabilized LCs, photo-reactive LC polymers, or any combination thereof. The LCs may include nematic LCs, twist-bend LCs, chiral nematic LCs, smectic LCs, or any combination thereof. In some embodiments, the birefringent medium layer 115 may be a polymer layer including a birefringent photo-refractive holographic material other than LCs, such as an amorphous polymer. For discussion purpose, in the following descriptions, the term "LCPH" may encompass polarization holograms based on LCs and polarization holograms based on birefringent photo-refractive holographic materials other than LCs.

In some embodiments, the LCPH element 100 may include additional elements, such as a substate at which the birefringent medium layer 115 is disposed, an alignment structure disposed between the substate and the birefringent medium layer 115, etc. The LCPH element 100 may be a passive element or an active element. The birefringent medium layer 115 may have a first surface 115-1 on one side and a second surface 115-2 on an opposite side. The first surface 115-1 and the second surface 115-2 may be surfaces along the light propagating path of the incident light 102.

The birefringent medium layer 115 may include optically anisotropic molecules (e.g., LC molecules) configured with a three-dimensional ("3D") orientational pattern to provide a polarization selective optical response. In some embodiments, an optic axis of the LC material or birefringent medium layer 115 may be configured with a spatially varying orientation in at least one in-plane direction. The in-plane direction may be an in-plane linear direction (e.g., an x-axis direction, a y-axis direction), an in-plane radial direction, an in-plane circumferential (e.g., azimuthal) direction, or a combination thereof. The LC molecules may be configured with an in-plane orientation pattern, in which the directors of the LC molecules may periodically or non-periodically vary in the at least one in-plane direction. In some embodiments, the optic axis of the LC material may also be configured with a spatially varying orientation in an out-of-plane direction. The directors of the LC molecules may also be configured with spatially varying orientations in an out-of-plane direction. For example, the optic axis of the LC material (or directors of the LC molecules) may twist in a helical fashion in the out-of-plane direction.

FIGS. 1B-1D schematically illustrate x-y sectional views of a portion of the LCPH element 100 shown in FIG. 1A, showing in-plane orientations of the optically anisotropic molecules 112 in the LCPH element 100, according to various embodiments of the present disclosure. The in-plane orientations of the optically anisotropic molecules 112 in the LCPH element 100 shown in FIGS. 1B-1D are for illustrative purposes. In some embodiments, the optically anisotropic molecules 112 in the LCPH element 100 may have other in-plane orientation patterns. For discussion purposes, rod-like LC molecules 112 are used as examples of the optically anisotropic molecules 112 of the birefringent medium layer 115. The rod-like LC molecule 112 may have a longitudinal axis (or an axis in the length direction) and a lateral axis (or an axis in the width direction). The longitudinal axis of the LC molecule 112 may be referred to as a director of the LC molecule 112 or an LC director. An orientation of the LC director may determine a local optic axis orientation or an orientation of the optic axis at a local point of the birefringent medium layer 115. The term "optic axis" may refer to a direction in a crystal. A light propagating in the optic axis direction may not experience birefringence (or double refraction). An optic axis may be a direction rather than a single line: lights that are parallel to that direction may experience no birefringence. The local optic axis may refer to an optic axis within a predetermined region of a crystal. For illustrative purposes, the LC directors of the LC molecules 112 shown in FIGS. 1B-1D are presumed to be in the surface of the birefringent medium layer 115 or in a plane parallel with the surface with substantially small tilt angles with respect to the surface.

FIG. 1B schematically illustrates an x-y sectional view of a portion of the LCPH element 100, showing a periodic in-plane orientation pattern of the orientations of the LC directors (indicated by arrows 188 in FIG. 1B) of the LC molecules 112 located in close proximity to or at a surface (e.g., at least one of the first surface 115-1 or the second surface 115-2) of the birefringent medium layer 115. The orientations of the LC directors located in close proximity to or at the surface of the birefringent medium layer 115 may exhibit a periodic rotation in at least one in-plane direction. The at least one in-plane direction is shown as the x-axis direction in FIG. 1B. The periodically varying in-plane orientations of the LC directors form a pattern. The in-plane orientation pattern of the LC directors shown in FIG. 1B may also be referred to as a grating pattern. Accordingly, the LCPH element 100 may function as a polarization selective grating, e.g., a PVH grating, or a PBP grating, etc.

As shown in FIG. 1B, the LC molecules 112 located in close proximity to or at a surface (e.g., at least one of the first surface 115-1 or the second surface 115-2) of the birefringent medium layer 115 may be configured with orientations of LC directors continuously changing (e.g., rotating) in a first predetermined in-plane direction along the surface or in a plane parallel with the surface. The first predetermined in-plane direction is the shown as the x-axis in-plane direction. The continuous rotation of orientations of the LC directors may form a periodic rotation pattern with a uniform (e.g., same) in-plane pitch $P_{in}$. It is noted that the first predetermined in-plane direction may be any other suitable direction along the surface (or in a plane parallel with the surface) of the birefringent medium layer 115, such as the y-axis direction, the radial direction, or the circumferential direction within the x-y plane. The pitch $P_{in}$ along the first predetermined (or x-axis) in-plane direction may be referred to as an in-plane pitch or a horizontal pitch. For simplicity of illustration and discussion, the LCPH element 100 shown in FIG. 1B is presumed to be a 1D grating. Thus, the orientations in the y-axis direction are the same. In some embodiments, the LCPH element 100 may be a 2D grating, and the orientations in the y-axis direction may also vary. The pattern with the uniform (or same) in-plane pitch $P_{in}$ may be referred to as a periodic LC director in-plane orientation pattern. The in-plane pitch $P_{in}$ is defined as a distance along the first predetermined (or x-axis) in-plane direction over which the orientations of the LC directors exhibit a rotation by a predetermined value (e.g., 180°). In other words, in a region substantially close to (including at) the surface of the birefringent medium layer 115, local optic axis orientations of the birefringent medium layer 115 may vary periodically in the first predetermined (or x-axis) in-plane direction with a pattern having the uniform (or same) in-plane pitch $P_{in}$.

In addition, in regions located in close proximity to or at the surface (e.g., at least one of the first surface 115-1 or the second surface 115-2) of the birefringent medium layer 115, the orientations of the directors of the LC molecules 112 may exhibit a rotation in a predetermined rotation direction, e.g., a clockwise direction or a counter-clockwise direction. Accordingly, the rotation of the orientations of the directors of the LC molecules 112 in regions located in close proximity to or at the surface of the birefringent medium layer 115 may exhibit a handedness, e.g., right handedness or left handedness. In the embodiment shown in FIG. 1B, in regions located in close proximity to or at the surface of the birefringent medium layer 115, the orientations of the directors of the LC molecules 112 may exhibit a rotation in a clockwise direction. Accordingly, the rotation of the orientations of the directors of the LC molecules 112 in regions located in close proximity to or at the surface of the birefringent medium layer 115 may exhibit a left handedness.

Although not shown, in some embodiments, in regions located in close proximity to or at the surface (e.g., at least one of the first surface 115-1 or the second surface 115-2) of the birefringent medium layer 115, the orientations of the directors of the LC molecules 112 may exhibit a rotation in a counter-clockwise direction. Accordingly, the rotation of the orientations of the directors of the LC molecules 112 in regions located in close proximity to or at the surface of the birefringent medium layer 115 may exhibit a right handedness. Although not shown, in some embodiments, in regions located in close proximity to or at the surface of the birefringent medium layer 115, domains in which the orientations of the directors of the LC molecules 112 exhibit a rotation in a clockwise direction (referred to as domains $D_L$) and domains in which the orientations of the directors of the LC molecules 112 exhibit a rotation in a counter-clockwise direction (referred to as domains $D_R$) may be alternately arranged in at least one in-plane direction, e.g., a first (or x-axis) in-plane direction and/or a second (or y-axis) in-plane direction.

FIG. 1C schematically illustrates an x-y sectional view of a portion of the LCPH element 100, showing a radially varying in-plane orientation pattern of the LC directors of the LC molecules 112 located in close proximity to or at a surface (e.g., at least one of the first surface 115-1 or the second surface 115-2) of the birefringent medium layer 115 shown in FIG. 1A. FIG. 1D illustrates a section of the in-plane orientation pattern taken along an x-axis in the birefringent medium layer 115 shown in FIG. 1C, according to an embodiment of the present disclosure. In a region in close proximity to or at a surface (e.g., at least one of the first surface 115-1 or the second surface 115-2) of the birefringent medium layer 115, the orientations of the optic axis of the birefringent medium layer 115 may exhibit a continuous rotation in at least two opposite in-plane directions (e.g., two opposite radial in-plane directions) from a center of the birefringent medium layer 115 to opposite peripheries of the birefringent medium layer 115 with a varying pitch. In some embodiments, the in-plane orientation pattern of the orientations of the LC directors shown in FIG. 1C may also be referred to as a lens pattern. Accordingly, the LCPH element 100 with the LC director orientations shown in FIG. 1C may function as a polarization selective lens, e.g., a PBP lens, or a PVH lens, etc.

As shown in FIG. 1C, the orientations of the LC molecules 112 located in close proximity to or at a surface (e.g., at least one of the first surface 115-1 or the second surface 115-2) of the birefringent medium layer 115 may be configured with an in-plane orientation pattern having a varying pitch in at least two opposite in-plane directions from a lens center 150 to opposite lens peripheries 155. For example, the orientations of the LC directors of LC molecules 112 located in close proximity to or at the surface of the birefringent medium layer 115 may exhibit a continuous rotation in at least two opposite in-plane directions (e.g., a plurality of opposite radial directions) from the lens center 150 to the opposite lens peripheries 155 with a varying pitch. The orientations of the LC directors from the lens center 150 to the opposite lens peripheries 155 may exhibit a rotation in a same rotation direction (e.g., clockwise, or counter-clockwise). A pitch $\Lambda$ of the radial in-plane orientation pattern may be defined as a distance in the radial in-plane direction over which the orientations of the LC directors, or azimuthal angles $\phi$ of the LC molecules 112, change by a predetermined angle (e.g., 180°) from a predetermined initial state.

As shown in FIG. 1D, according to the LC director field along the x-axis direction, the pitch $\Lambda$ may be a function of the distance from the lens center 150. The pitch $\Lambda$ may monotonically decrease from the lens center 150 to the lens peripheries 155 in the at least two opposite in-plane directions (e.g., two opposite radial directions) in the x-y plane, e.g., $\Lambda_0 > \Lambda_1 > \ldots > \Lambda_r$. $\Lambda_0$ is the pitch at a central region of the lens pattern, which may be the largest. The pitch $\Lambda_r$ is the pitch at a periphery region (e.g., periphery 155) of the lens pattern, which may be the smallest. In some embodiments, the azimuthal angle $\phi$ of the LC molecule 112 may change in proportional to the distance from the lens center 150 to a local point of the birefringent medium layer 115 at which the LC molecule 112 is located.

The in-plane orientation patterns of the LC directors shown in FIGS. 1B-1D are for illustrative purposes. The LCPH element 100 may have any suitable in-plane orientation patterns of the LC directors. For illustrative purposes, FIGS. 1C and 1D show an in-plane orientation pattern of the LC directors when the LCPH element 100 is a PBP or PVH lens functioning as an on-axis spherical lens. In some embodiments, the LCPH element 100 may be a PBP or PVH lens functioning as an off-axis spherical lens, a cylindrical lens, an aspheric lens, or a freeform lens, etc.

Figure 1E:
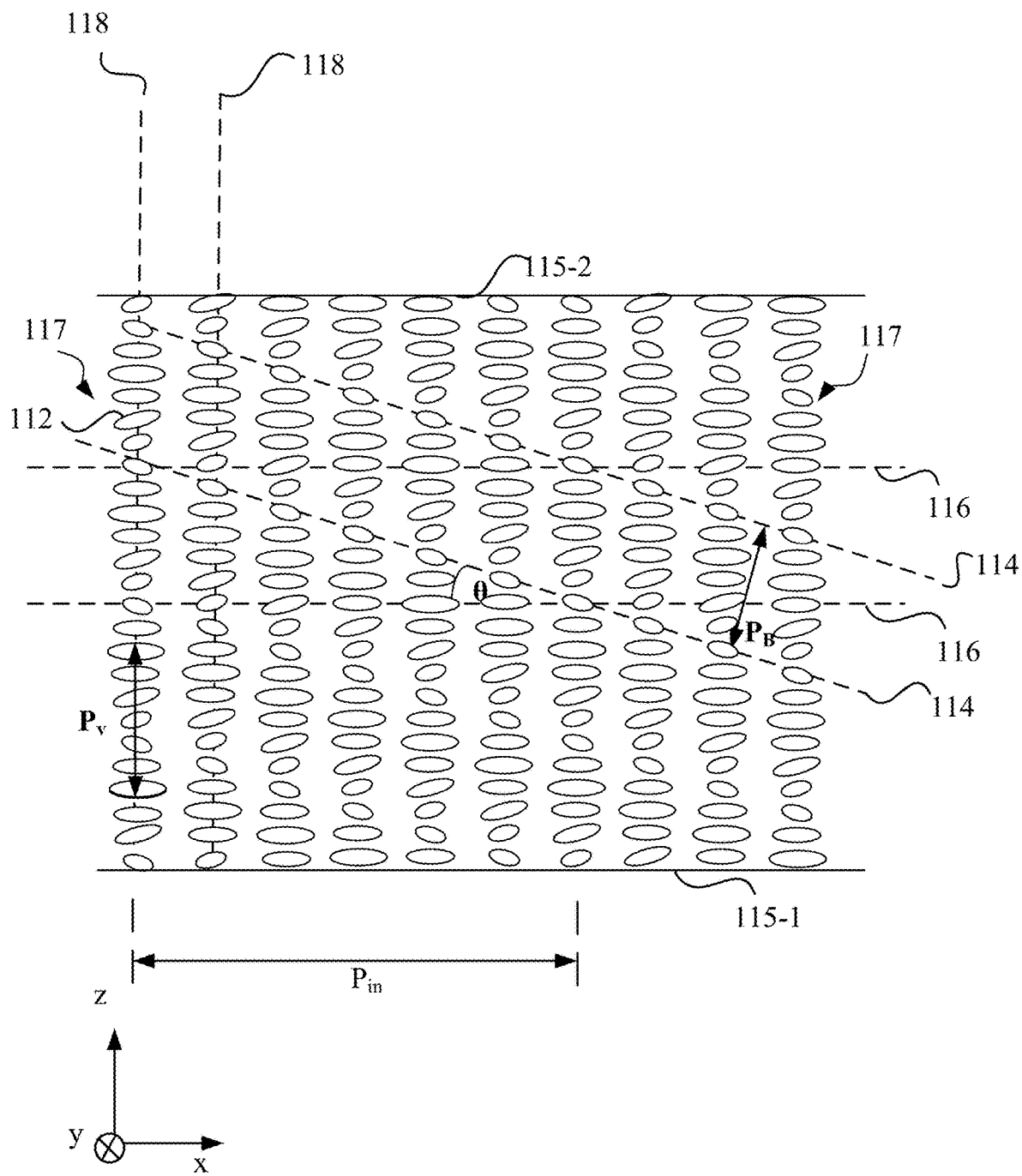
FIGS. 1E-1H schematically illustrate various views of a portion of the LCPH element shown in FIG. 1A, showing out-of-plane orientations of optically anisotropic molecules in the LCPH element, according to various embodiments of the present disclosure.

FIGS. 1E-1H schematically illustrate y-z sectional views of a portion of the LCPH element 100, showing out-of-plane orientations of the LC directors of the LC molecules 112 in the LCPH element 100, according to various embodiments of the present disclosure. For discussion purposes, FIGS. 1E-1H schematically illustrate out-of-plane (e.g., along z-axis direction) orientations of the LC directors of the LC molecules 112 when the in-plane (e.g., in a plane parallel to the x-y plane) orientation pattern is a periodic in-plane orientation pattern shown in FIG. 1B. As shown in FIG. 1E, within a volume of the birefringent medium layer 115, the LC molecules 112 may be arranged in a plurality of helical structures 117 with a plurality of helical axes 118 and a helical pitch $P_h$ along the helical axes. The azimuthal angles of the LC molecules 112 arranged along a single helical structure 117 may continuously vary around a helical axis 118 in a predetermined rotation direction, e.g., clockwise direction or counter-clockwise direction. In other words, the orientations of the LC directors of the LC molecules 112 arranged along a single helical structure 117 may exhibit a continuous rotation around the helical axis 118 in a predetermined rotation direction. That is, the azimuthal angles associated of the LC directors may exhibit a continuous change around the helical axis in the predetermined rotation direction. Accordingly, the helical structure 117 may exhibit a handedness, e.g., right handedness or left handedness. The helical pitch $P_h$ may be defined as a distance along the helical axis 118 over which the orientations of the LC directors exhibit a rotation around the helical axis 118 by 360°, or the azimuthal angles of the LC molecules vary by 360°.

In the embodiment shown in FIG. 1E, the helical axes 118 may be substantially perpendicular to the first surface 115-1 and/or the second surface 115-2 of the birefringent medium layer 115. In other words, the helical axes 118 of the helical structures 117 may be in a thickness direction (e.g., a z-axis direction) of the birefringent medium layer 115. That is, the LC molecules 112 may have substantially small tilt angles (including zero degree tilt angles), and the LC directors of the LC molecules 112 may be substantially orthogonal to the helical axis 118. The birefringent medium layer 115 may have a vertical pitch $P_v$, which may be defined as a distance along the thickness direction of the birefringent medium layer 115 over which the orientations of the LC directors of the LC molecules 112 exhibit a rotation around the helical axis 118 by 180° (or the azimuthal angles of the LC directors vary by 180°). In the embodiment shown in FIG. 1E, the vertical pitch $P_v$ may be half of the helical pitch $P_h$.

As shown in FIG. 1E, the LC molecules 112 from the plurality of helical structures 117 having a first same orientation (e.g., same tilt angle and azimuthal angle) may form a first series of parallel refractive index planes 114 periodically distributed within the volume of the birefringent medium layer 115. Although not labeled, the LC molecules 112 with a second same orientation (e.g., same tilt angle and azimuthal angle) different from the first same orientation may form a second series of parallel refractive index planes periodically distributed within the volume of the birefringent medium layer 115. Different series of parallel refractive index planes may be formed by the LC molecules 112 having different orientations. In the same series of parallel and periodically distributed refractive index planes 114, the LC molecules 112 may have the same orientation and the refractive index may be the same. Different series of refractive index planes 114 may correspond to different refractive indices. When the number of the refractive index planes 114 (or the thickness of the birefringent medium layer) increases to a sufficient value, Bragg diffraction may be established according to the principles of volume gratings. Thus, the periodically distributed refractive index planes 114 may also be referred to as Bragg planes 114. In some embodiments, as shown in FIG. 1E, the refractive index planes 114 may be slanted with respect to the first surface 115-1 or the second surface 115-2. In some embodiments, the refractive index planes 114 may be perpendicular to or parallel with the first surface 115-1 or the second surface 115-2. Within the birefringent medium layer 115, there may exist different series of Bragg planes. A distance (or a period) between adjacent Bragg planes 114 of the same series may be referred to as a Bragg period PB. The different series of Bragg planes formed within the volume of the birefringent medium layer 115 may produce a varying refractive index profile that is periodically distributed in the volume of the birefringent medium layer 115. The birefringent medium layer 115 may diffract an input light satisfying a Bragg condition through Bragg diffraction.

As shown in FIG. 1E, the birefringent medium layer 115 may also include a plurality of LC molecule director planes (or molecule director planes) 116 arranged in parallel with one another within the volume of the birefringent medium layer 115. An LC molecule director plane (or an LC director plane) 116 may be a plane formed by or including the LC directors of the LC molecules 112. In the example shown in FIG. 1E, the LC directors in the LC director plane 116 have different orientations, i.e., the orientations of the LC directors vary in the x-axis direction. The Bragg plane 114 may form an angle θ with respect to the LC molecule director plane 116. In the embodiment shown in FIG. 1E, the angle θ may be an acute angle, e.g., 0°<θ<90°. The LCPH element 100 including the birefringent medium layer 115 shown in FIG. 1B may function as a transmissive PVH element, e.g., a transmissive PVH grating.

Figure 1F:
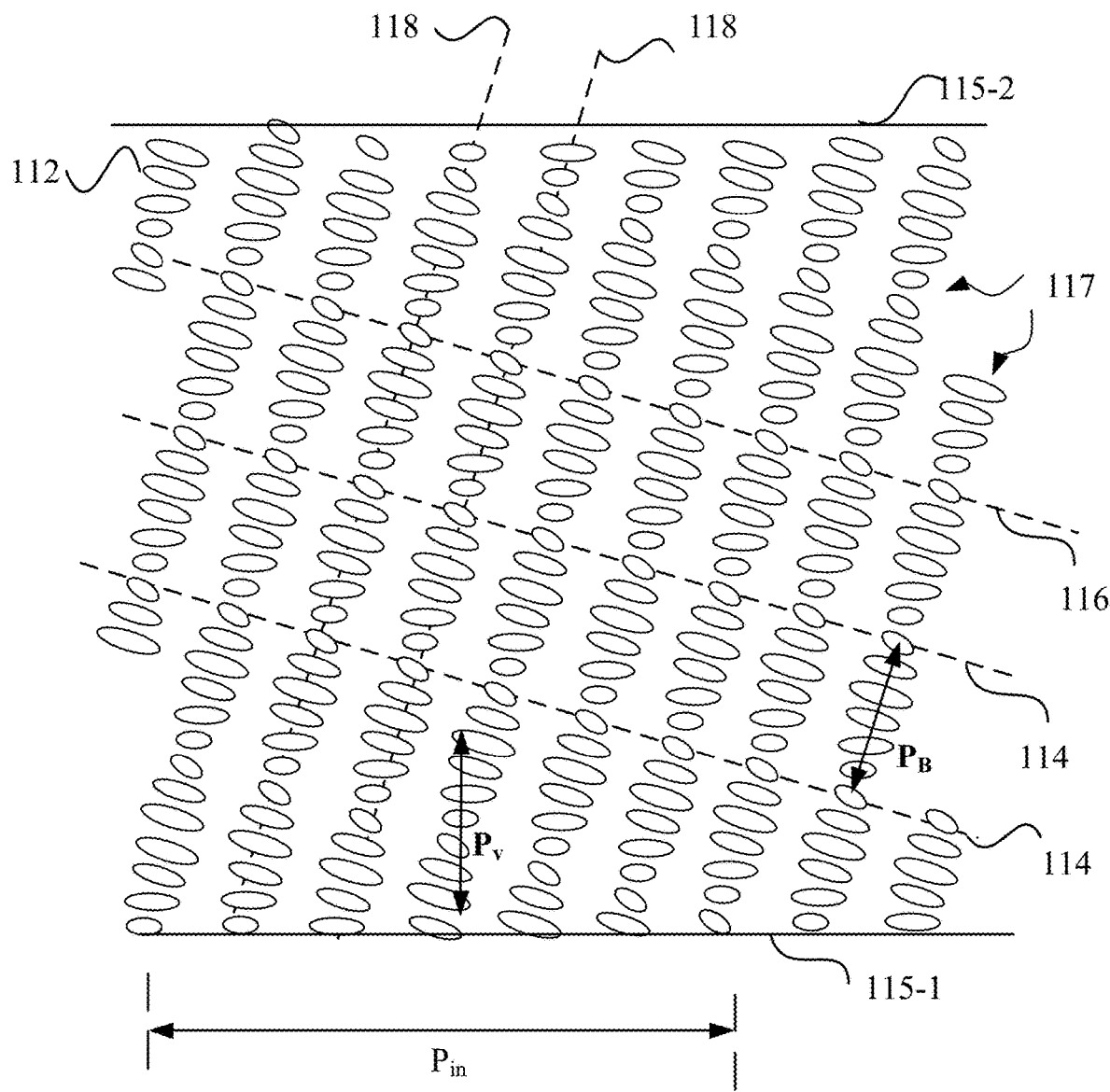

In the embodiment shown in FIG. 1F, the helical axes 118 of helical structures 117 may be tilted with respect to the first surface 115-1 and/or the second surface 115-2 of the birefringent medium layer 115 (or with respect to the thickness direction of the birefringent medium layer 115). For example, the helical axes 118 of the helical structures 117 may have an acute angle or obtuse angle with respect to the first surface 115-1 and/or the second surface 115-2 of the birefringent medium layer 115. In some embodiments, the LC directors of the LC molecule 112 may be substantially orthogonal to the helical axes 118 (i.e., the tilt angle may be substantially zero degree). In some embodiments, the LC directors of the LC molecule 112 may be tilted with respect to the helical axes 118 at an acute angle. The birefringent medium layer 115 may have a vertical periodicity (or pitch) $P_v$. In the embodiment shown in FIG. 1F, an angle θ (not shown) between the LC director plane 116 and the Bragg plane 114 may be substantially 0° or 180°. That is, the LC director plane 116 may be substantially parallel with the Bragg plane 114. In the example shown in FIG. 1F, the orientations of the directors in the molecule director plane 116 may be substantially the same. The LCPH element 100 including the birefringent medium layer 115 shown in FIG. 1F may function as a reflective PVH element, e.g., a reflective PVH grating.

Figure 1G:
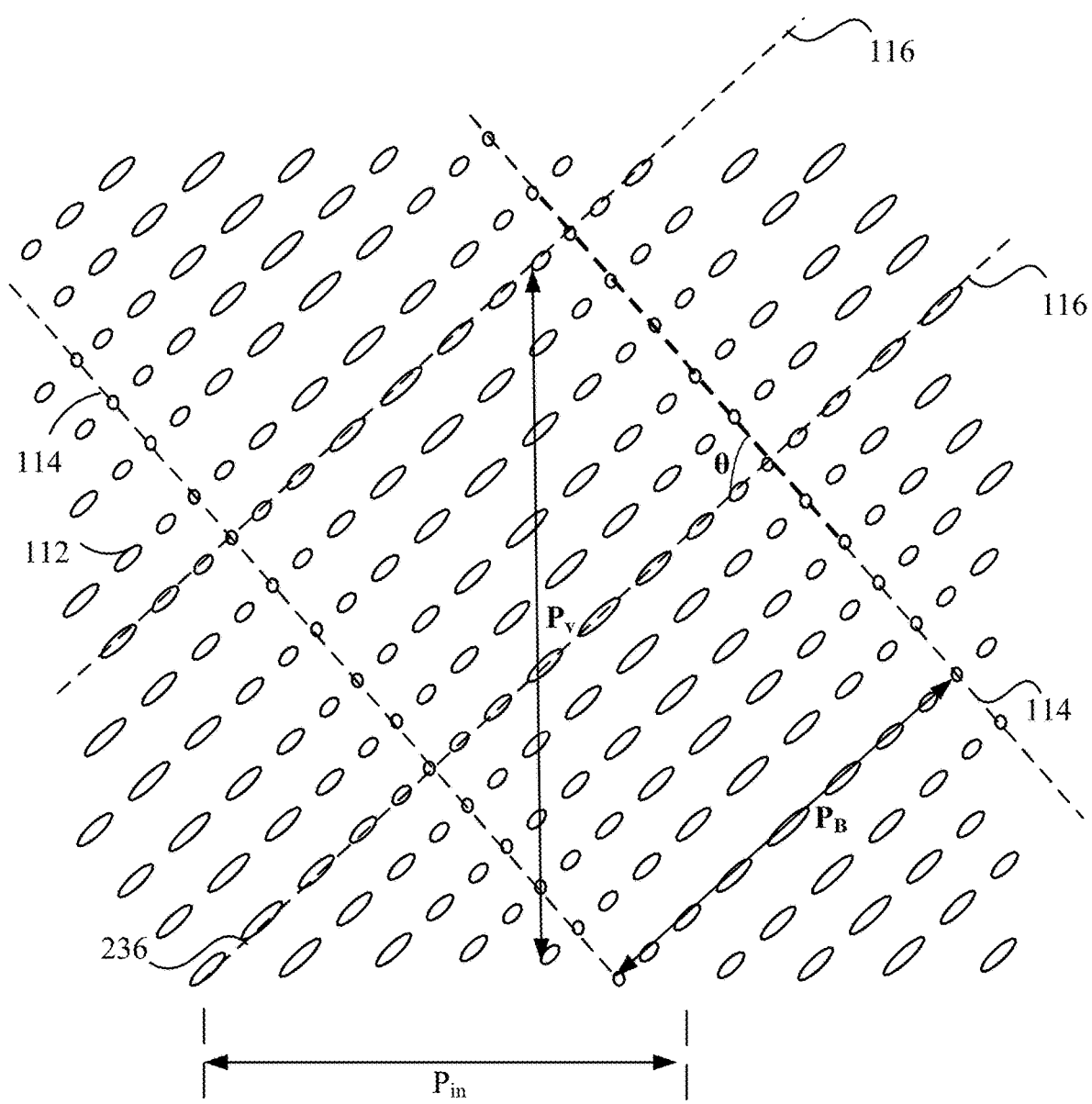

In the embodiment shown in FIG. 1G, the birefringent medium layer 115 may also include a plurality of LC director planes 116 arranged in parallel within the volume of the birefringent medium layer 115. In the embodiment shown in FIG. 1F, an angle θ between the LC director plane 116 and the Bragg plane 114 may be a substantially right angle, e.g., θ=90°. That is, the LC director plane 116 may be substantially orthogonal to the Bragg plane 114. In the example shown in FIG. 1F, the LC directors in the LC director plane 116 may have different orientations. In some embodiments, the LCPH element 100 including the birefringent medium layer 115 shown in FIG. 1F may function as a transmissive PVH element, e.g., a transmissive PVH grating.

Figure 1H:
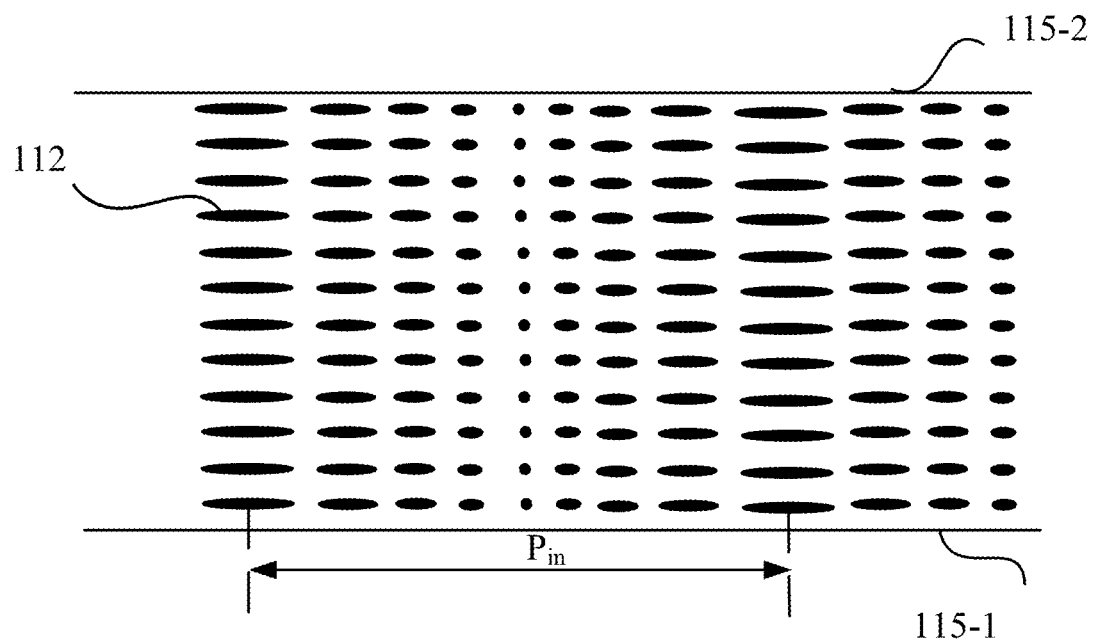

In the embodiment shown in FIG. 1H, in a volume of the birefringent medium layer 115, along the thickness direction (e.g., the z-axis direction) of the birefringent medium layer 115, the directors (or the azimuth angles) of the LC molecules 112 may remain in the same orientation (or same angle value) from the first surface 115-1 to the second surface 115-2 of the birefringent medium layer 115. In some embodiments, the thickness of the birefringent medium layer 115 may be configured as $d=\lambda/(2*\Delta n)$, where $\lambda$ is a design wavelength, $\Delta n$ is the birefringence of the LC material of the birefringent medium layer 115, and $\Delta n = n_e - n_o$, where $n_e$ and $n_o$ are the extraordinary and ordinary refractive indices of the LC material, respectively. In some embodiments, the LCPH element 100 including the birefringent medium layer 115 shown in FIG. 1F may function as a PBP element, e.g., a PBP grating.

Figure 2A:
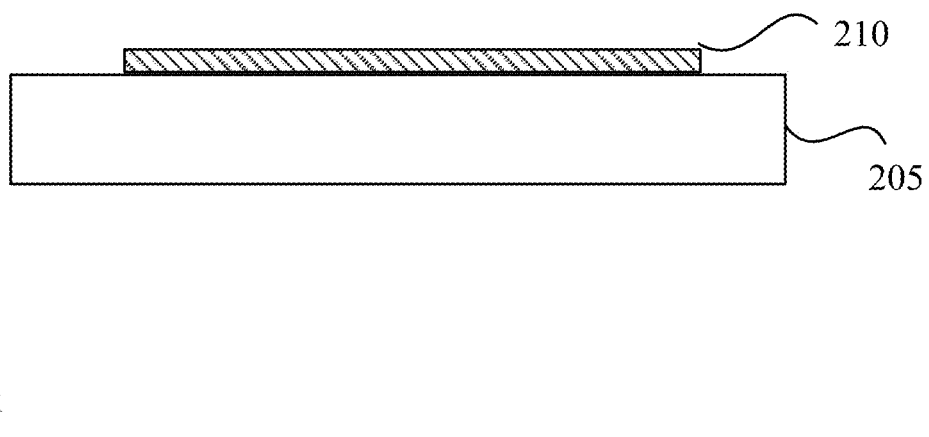
FIGS. 2A-2C schematically illustrate processes for fabricating an LCPH element, according to an embodiment of the present disclosure.
Figure 2B:
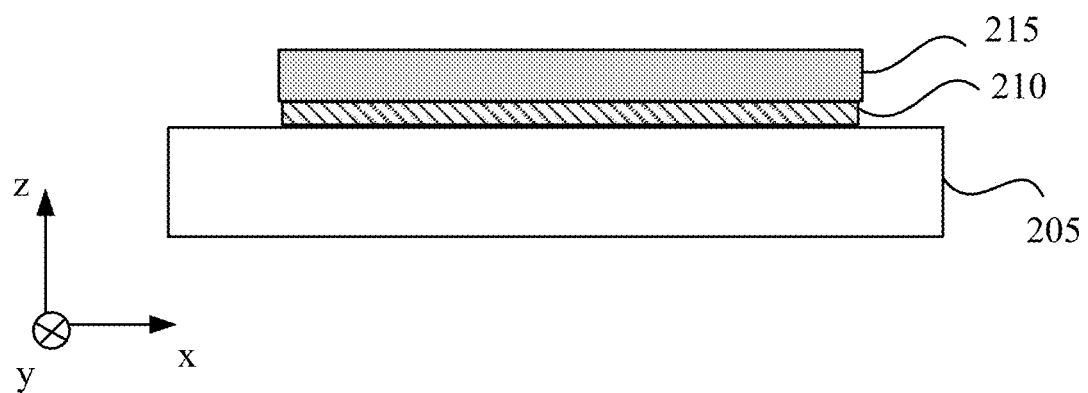
Figure 2C:
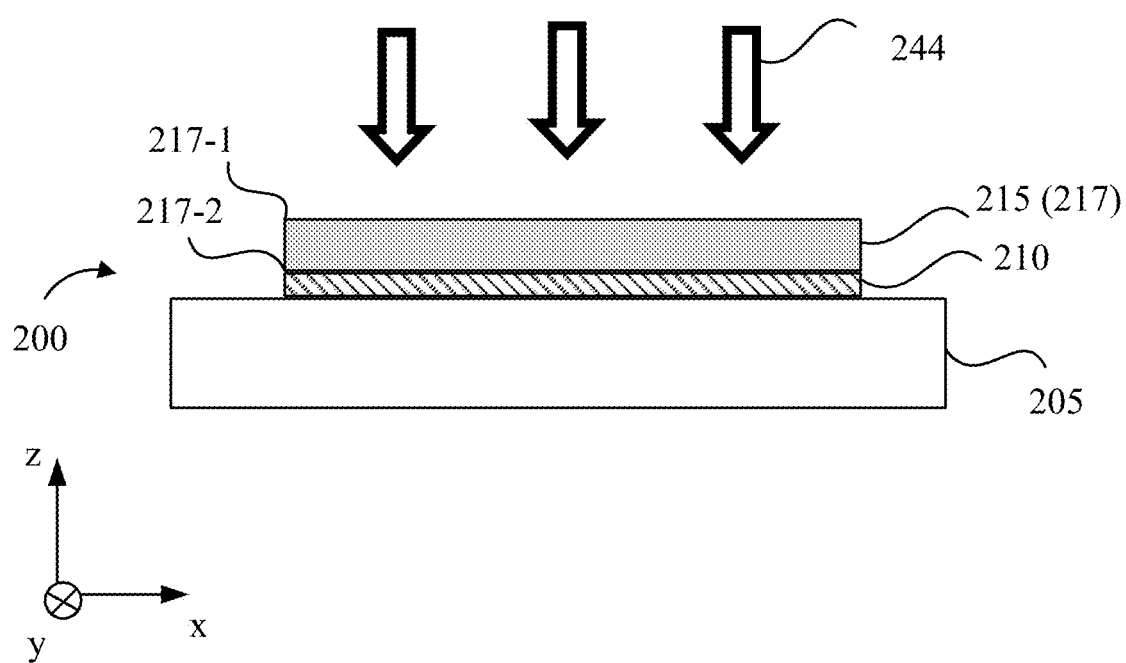

FIGS. 2A-2C schematically illustrate processes for fabricating an LCPH element, according to an embodiment of the present disclosure. The fabrication process shown in FIGS. 2A-2C may include surface alignment and polymerization. The LCPH element may be a PBP element or a PVH element. For illustrative purposes, the substrate and different layers, films, or structures formed thereon are shown as having flat surfaces. In some embodiments, the substrate and different layers or films or structures may have curved surfaces.

As shown in FIG. 2A, an alignment structure 210 may be formed on a surface (e.g., a top surface) of a substate 205. The alignment structure 210 may provide an alignment pattern corresponding to a predetermined in-plane orientation pattern. The alignment structure 210 may include any suitable alignment structure, such as a photo-alignment material ("PAM") layer, a mechanically rubbed alignment layer, an alignment layer with anisotropic nanoimprint, an anisotropic relief, or a ferroelectric or ferromagnetic material layer, etc.

In some embodiments, the alignment structure 210 may be a PAM layer, and the alignment pattern provided by the PAM layer may be formed via any suitable approach, such as holographic interference, laser direct writing, ink-jet printing, or various other forms of lithography. The PAM layer may include a polarization sensitive material (e.g., a photo-alignment material) that can have a photo-induced optical anisotropy when exposed to a polarized light irradiation. Molecules (or fragments) and/or photo-products of the polarization sensitive material may be configured to generate an orientational ordering under the polarized light irradiation. For example, the polarization sensitive material may be dissolved in a solvent to form a solution. The solution may be dispensed on the substrate 205 using any suitable solution dispensing process, e.g., spin coating, slot coating, blade coating, spray coating, or jet (ink-jet) coating or printing. The solvent may be removed from the coated solution using a suitable process, e.g., drying, or heating, thereby leaving the polarization sensitive material on the substate 205.

The polarization sensitive material may be optically patterned via the polarized light irradiation, to form the alignment pattern corresponding to a predetermined in-plane orientation pattern. In some embodiments, the polarization sensitive material may include elongated anisotropic photo-sensitive units (e.g., small molecules or fragments of polymeric molecules). After being subjected to a sufficient exposure of the polarized light irradiation, local alignment directions of the anisotropic photo-sensitive units may be induced in the polarization sensitive material, resulting in an alignment pattern (or in-plane modulation) of an optic axis of the polarization sensitive material.

In some embodiments, an entire layer of the polarization sensitive material may be formed on the substate via a single dispensing process, and the layer of the polarization sensitive material may be subjected to the polarized light irradiation that has a substantially uniform intensity and spatially varying orientations (or polarization directions) of linear polarizations in a predetermined space in which the entire layer of the polarization sensitive material is disposed. In some embodiments, an entire layer of the polarization sensitive material may be formed on the substrate via a plurality of dispensing processes. For example, during a first time period, a first predetermined amount of the polarization sensitive material may be dispensed at a first location of the substate 205, and exposed to a first polarized light irradiation. During a second time period, a second predetermined amount of the polarization sensitive material may be dispensed at a second location of the substate 205, and exposed to a second polarized light irradiation. The first polarized light irradiation may have a first uniform intensity, and a first linear polarization direction in a space in which the first predetermined amount of the polarization sensitive material is disposed. The second polarized light irradiation may have a second uniform intensity, and a second linear polarization direction in a space in which the second predetermined amount of the polarization sensitive material is disposed. The first uniform intensity and the second uniform intensity may be substantially the same. The first linear polarization direction and the second linear polarization direction may be substantially the same or different from one another. The process may be repeated until a PAM layer that provides a desirable alignment pattern is obtained.

The substate 205 may provide support and protection to various layers, films, and/or structures formed thereon. In some embodiments, the substate 205 may also be transparent in the visible wavelength band (e.g., about 380 nm to about 700 nm). In some embodiments, the substate 205 may also be at least partially transparent in at least a portion of the infrared ("IR") band (e.g., about 700 nm to about 1 mm). The substate 205 may include a suitable material that is at least partially transparent to lights of the above-listed wavelength ranges, such as, a glass, a plastic, a sapphire, or a combination thereof, etc. The substate 205 may be rigid, semi-rigid, flexible, or semi-flexible. The substate 205 may include a flat surface or a curved surface, on which the different layers or films may be formed. In some embodiments, the substate 205 may be a part of another optical element or device (e.g., another opto-electrical element or device). For example, the substate 205 may be a solid optical lens, a part of a solid optical lens, or a light guide (or waveguide), etc. In some embodiments, the substate 205 may be a part of a functional device, such as a display screen.

After the alignment structure 210 is formed on the substate 205, as shown in FIG. 2B, a birefringent medium layer 215 may be formed on the alignment structure 210 by dispensing, e.g., coating or depositing, a birefringent medium onto the alignment structure 210. The birefringent medium may have an intrinsic birefringence, and may include optically anisotropic molecules. In some embodiments, the birefringent medium may include one or more polymerizable birefringent materials, such reactive mesogens ("RMs"). RMs may be also referred to as a polymerizable mesogenic or liquid-crystalline compound, or polymerizable LCs. For discussion purposes, the term "liquid crystal molecules" or "LC molecules" may encompass both polymerizable LC molecules (e.g., RM molecules) and non-polymerizable LC molecules. For discussion purposes, in the following descriptions, RMs are used as an example of polymerizable birefringent materials, and RM molecules are used as an example of optically anisotropic molecules included in a polymerizable birefringent material. In some embodiments, polymerizable birefringent materials other than RMs may also be used.

In some embodiments, the birefringent medium may also include other ingredients, such as solvents, initiators (e.g., photo-initiators or thermal initiators), chiral dopants, or surfactants, etc. In some embodiments, the birefringent medium may not have an intrinsic or induced chirality. In some embodiments, the birefringent medium may have an intrinsic or induced chirality. For example, in some embodiments, the birefringent medium may include a host birefringent material and a chiral dopant doped into the host birefringent material at a predetermined concentration. The chirality may be introduced by the chiral dopant doped into the host birefringent material, e.g., chiral RMs doped into achiral RMs. In some embodiments, the birefringent medium may include a birefringent material having an intrinsic molecular chirality, and chiral dopants may not be doped into the birefringent material. The chirality of the birefringent medium may result from the intrinsic molecular chirality of the birefringent material. For example, the birefringent material may include chiral liquid crystal molecules, or molecules having one or more chiral functional groups.

In some embodiments, a birefringent medium may be dissolved in a solvent to form a solution. A suitable amount of the solution may be dispensed (e.g., coated, or sprayed, etc.) on the alignment structure 210 to form the birefringent medium layer 215, as shown in FIG. 2C. In some embodiments, the solution containing the birefringent medium may be coated on the alignment structure 210 using a suitable process, e.g., spin coating, slot coating, blade coating, spray coating, or jet (ink-jet) coating or printing. In some embodiments, the birefringent medium may be heated to remove the remaining solvent. This process may be referred to as a pre-exposure heating. The alignment structure 210 may provide a surface alignment to at least RM molecules that are in close proximity to (including in contact with) the alignment structure 210. For example, the alignment structure 210 may at least align the RM molecules that are in contact with the alignment structure 210 in the predetermined in-plane orientation pattern. Such an alignment procedure may be referred to as a surface-mediated alignment.

In some embodiments, when the alignment structure 210 is the PAM layer, the RM molecules in the birefringent medium may be at least partially aligned along the local alignment directions of the anisotropic photo-sensitive units in the PAM layer to form the predetermined in-plane orientation pattern. Thus, the alignment pattern formed in the PAM layer (or the in-plane orientation pattern of the optic axis of the PAM layer) may be transferred to the birefringent medium layer 215. Such an alignment procedure may be referred to as a surface-mediated photo-alignment. The photo-alignment material for a surface-mediated photo-alignment may also be referred to as a surface photo-alignment material.

In some embodiments, after the optically anisotropic molecules (e.g., RM molecules) in the birefringent medium layer 215 are aligned by the alignment structure 210, the birefringent medium layer 215 may be heat treated (e.g., annealed) in a temperature range corresponding to a nematic phase of the RMs to enhance the alignments (or orientation pattern) of the RMs (not shown in FIG. 2C). This process may be referred to as a post-exposure heat treatment (e.g., annealing). In some embodiments, the heat treatment of the birefringent medium layer 215 may be omitted.

In some embodiments, after the RMs are aligned by the alignment structure 210, the RMs may be polymerized, e.g., thermally polymerized or photo-polymerized, to solidify and stabilize the orientational pattern of the optic axis of the birefringent medium layer 215. In some embodiments, as shown in FIG. 2C, the birefringent medium layer 215 may be irradiated with, e.g., a UV light 244. Under a sufficient UV light irradiation, the RM monomers in the birefringent medium layer 215 may be polymerized or crosslinked to stabilize the orientational pattern of the optic axis of the birefringent medium layer 215. In some embodiments, the polymerization of the RM monomers under the UV light irradiation may be carried out in air, or in an inert atmosphere formed, for example, by nitrogen, argon, carbon-dioxide, or in vacuum. After the RMs are polymerized, the birefringent medium layer 215 may become an LCP layer 217, e.g., a polymerized RM layer 217.

Thus, as FIG. 2C shows, an LCPH element (e.g., an LCPH grating) 200 may be obtained. In some embodiments, the LCPH element 200 fabricated based on the fabrication processes shown in FIGS. 2A-2C may be a passive LCPH element, e.g., a passive PBP element, a passive PVH element, etc. The passive LCPH element may be a transmissive LCPH element (e.g., a PBP element, a transmissive PVH element, etc.) or a reflective LCPH element (e.g., a reflective PVH element).

In some embodiments, the substate 205 and/or the alignment structure 210 may be used to fabricate, store, or transport the fabricated LCPH element 200. In some embodiments, the substate 205 and/or the alignment structure 210 may be detachable or removable from the fabricated LCPH element 200 after the LCPH element 200 is fabricated or transported to another place or device. That is, the substate 205 and/or the alignment structure 210 may be used in fabrication, transportation, and/or storage to support the LCPH element 200 provided on the substate 205 and/or the alignment structure 210, and may be separated or removed from the LCPH element 200 when the fabrication of the LCPH element 200 is completed, or when the LCPH element 200 is to be implemented in an optical device. In some embodiments, the substate 205 and/or the alignment structure 210 may not be separated from the LCPH element 200.

Referring FIG. 2C, the LCP layer (e.g., polymerized RM layer) 217 may have a first surface 217-1 (e.g., an upper surface) exposed to an outside environment (e.g., air, or an inert atmosphere), and a second surface 217-2 (e.g., a lower surface) opposite to the first surface 217-1. The first surface 217-1 of the polymerized RM layer 217 may also be an interface between the polymerized RM layer 217 and the outside environment, and the second surface 217-2 of the polymerized RM layer 217 may also be an interface between the polymerized RM layer 217 and the alignment structure 210. The first surface 217-1 of the polymerized RM layer 217 may also be referred to as a free surface 217-1 of the polymerized RM layer 217. Inventors have found that the free surface 217-1 of the LCP layer (e.g., polymerized RM layer) 217 appears to be a wavy surface with spaced peaks and valleys.

Figure 3A:
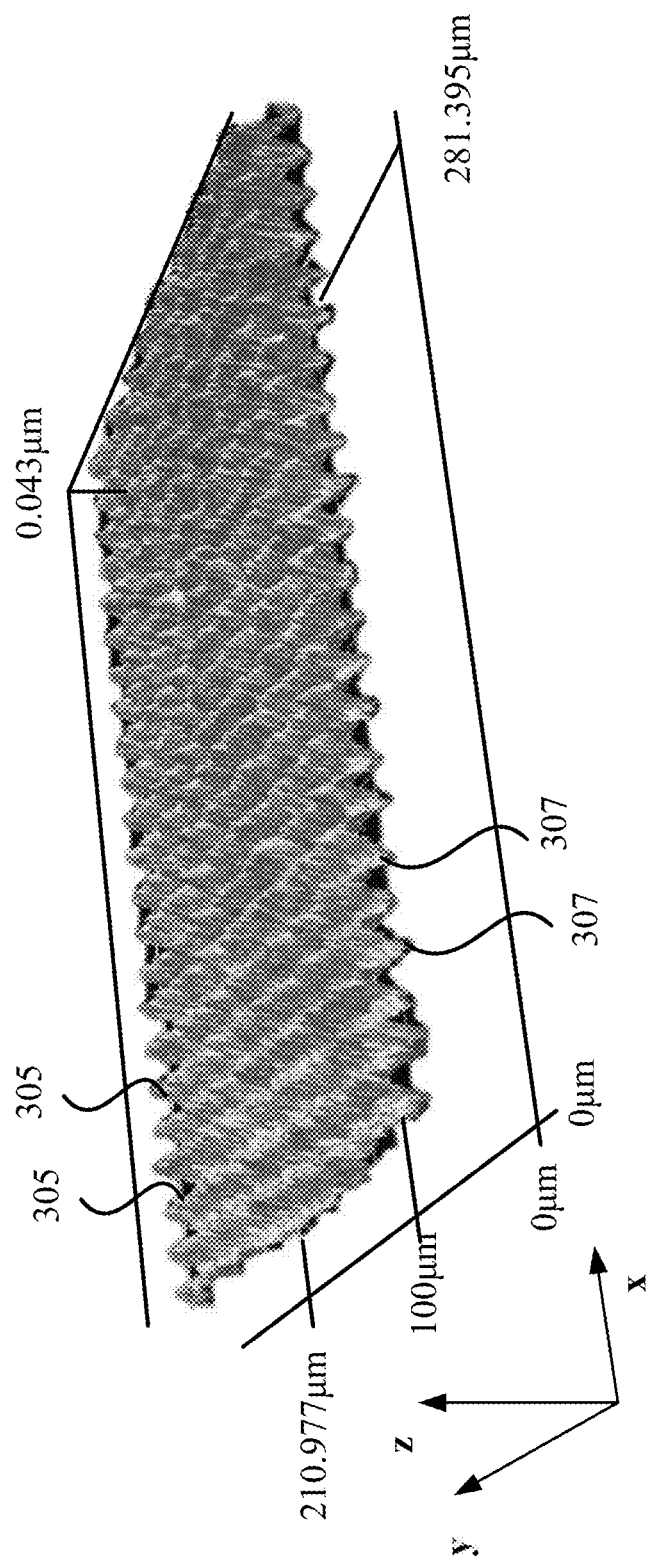
FIG. 3A illustrates a diagram showing a 3D surface profile of a portion of a liquid crystal polymer ("LCP") layer.

FIG. 3A illustrates a diagram showing a 3D surface profile of a portion of an LCP layer that may be included in an LCPH element. The LCPH element may be fabricated based on the fabrication process shown in FIGS. 2A-2C. The LCPH element may be similar to the LCPH element 200 shown in FIG. 2C, e.g., the LCPH element may include a substate, an alignment structure, and an LCP layer. The LCP layer may be a polymerized RM layer. The LCPH element may functions as a PBP grating, e.g., RM molecules may be aligned to have in-plane orientations similar to that shown in FIG. 1B, and out-of-plane orientations similar to that shown in FIG. 1H.

Referring back to FIG. 3A, the polymerized RM layer may have a free surface exposed to an outside environment (e.g., air, or an inert atmosphere), and another surface that is opposite to the free surface and in contract with the alignment structure. The free surface of the polymerized RM layer is scanned using a laser profiler. FIG. 3A illustrates the 3D surface profile of a portion (a region of about 280 μm by 210 μm) of the free surface of the polymerized RM layer. As shown in FIG. 3A, the z-axis direction is the thickness direction of the polymerized RM layer, and the x-axis direction and the y-axis direction are the longitudinal direction and the lateral direction of the polymerized RM layer, respectively. The x-axis direction is referred to as the x-axis in-plane direction or the first predetermined in-plane direction, and the y-axis direction is referred to as the y-axis in-plane direction or the second predetermined in-plane direction. The first predetermined (or x-axis) direction is the in-plane direction of the polymerized RM layer, along which the in-plane pitch $P_{in}$ of the in-plane orientation pattern is defined. FIG. 3A shows the measured surface profile of a region of about 280 μm by 210 μm. As shown in FIG. 3A, the free surface of the polymerized RM layer exhibits wavy structures with alternating peaks 305 and valleys 307. The wavy structures may propagate in the first predetermined (or x-axis) in-plane direction of the polymerized RM layer, and extend in the second predetermined (or y-axis) in-plane direction. In the example shown in FIG. 3A, the first predetermined in-plane direction and the second predetermined in-plane direction are perpendicular to one another.

Figure 3B:
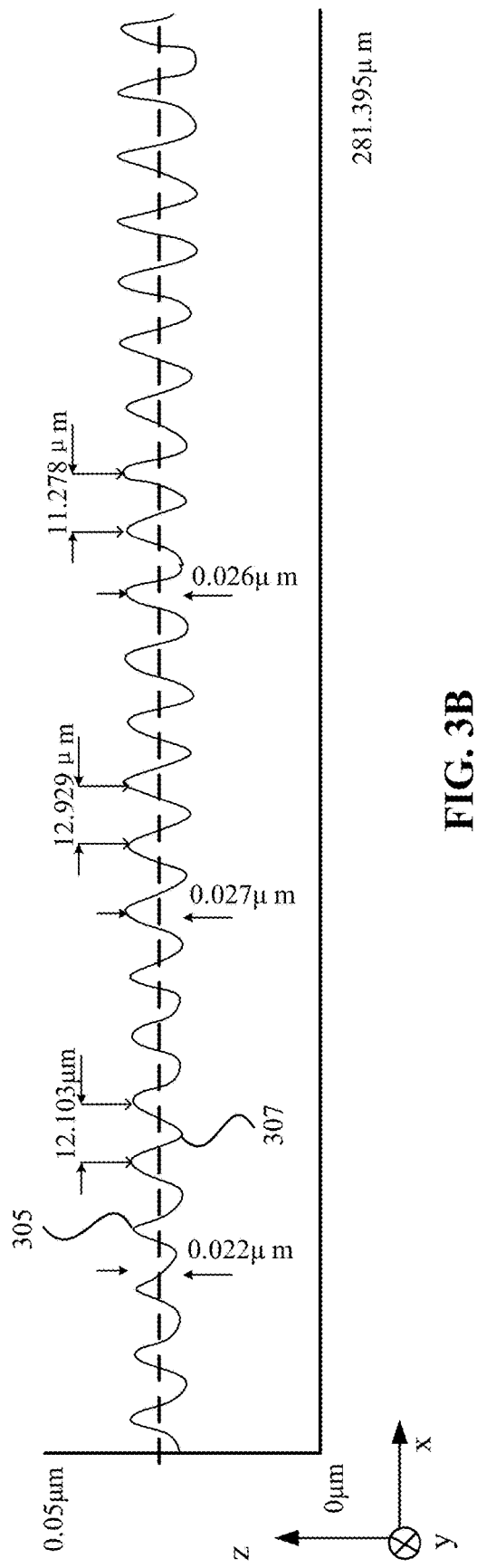
FIG. 3B illustrates a diagram showing a 2D surface profile of a portion of the LCP layer shown in FIG. 3A.

FIG. 3B illustrates a diagram showing a 2D surface profile of a portion of the LCP layer shown in FIG. 3A. As shown in FIG. 3B, the horizontal axis represents the location of a surface feature of the polymerized RM layer along a predetermined planar dimension (e.g., length or width direction), and the vertical axis represents the measured surface elevations relative to a reference plane. The measured surface elevations indicate that the surface of the LCP layer has a wavy shape. Thus, the surface is referred to as a wavy surface, or as having wavy structures. In the present disclosure, an average height is used to quantify the roughness of the wavy surface. The distances between the peaks and valleys of the wavy surface are obtained. An average height is calculated by averaging the distances. It is understood that the average height is also the average amplitude of the wavy structures. In the following descriptions, the "average height" of the wavy surface or wavy structures may be simply referred to as the "height" of the wavy surface or wavy structures. The wavy structures show substantially periodical oscillations in one direction (e.g., the x-axis direction), and extend in another direction (e.g., the y-axis direction). The direction of the periodicity of the wavy structures is along the first predetermined (or x-axis) in-plane direction of the polymerized RM layer. A period of the wavy structures may be defined as a distance between two neighboring peaks 305 or two neighboring valleys 307. As shown in FIG. 3B, the average period of the wavy structures is about 12 μm and the average height of the wavy structures is about 0.025 μm.

Figure 3C:
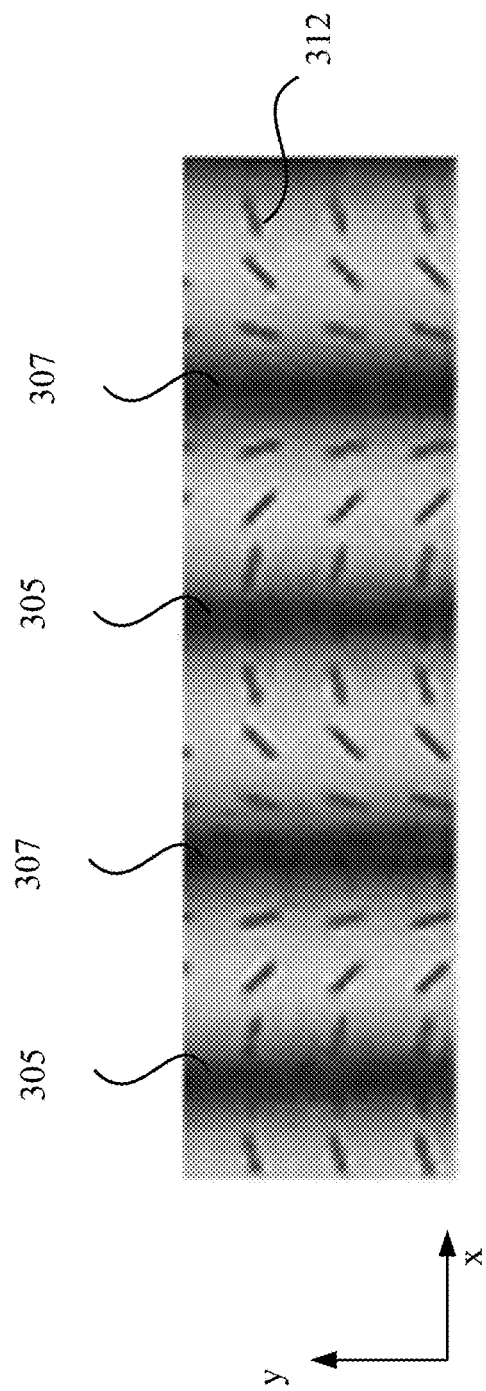
FIG. 3C illustrates a diagram showing a superimposition of optically anisotropic molecules and wavy structures of the LCP layer shown in FIGS. 3A and 3B.

FIG. 3C illustrates a diagram showing an x-y sectional view of a superimposition of optically anisotropic molecules (e.g., RM molecules) 312 and the wavy structures of the LCP layer (e.g., polymerized RM layer) shown in FIGS. 3A and 3B. Inventors have observed, as shown in FIG. 3C, that the peaks 305 of the wavy structures may correspond to the regions of the polymerized RM layer in which the RM molecules 312 are substantially aligned in the first predetermined (x-axis) in-plane direction of the polymerized RM layer. The valleys 307 of the wavy structures may substantially correspond to the regions of the polymerized RM layer in which the RM molecules 312 are substantially aligned in the second predetermined (y-axis) in-plane direction. The period of the wavy structures may be substantially the same as the in-plane pitch of the in-plane orientation pattern of the RM molecules 312 in the first predetermined (or x-axis) in-plane direction.

Inventors have observed that the wavy structures shown in FIGS. 3A-3C may result from the anisotropic diffusion of monomers (e.g., RM monomers) located in close proximity to or at a free surface of a birefringent medium layer (e.g., a RM layer) during the polymerization process, e.g., the photo-polymerization process. For discussion purposes, the RM layer may be referred to as a layer of RMs before or during the polymerization process, and the RM layer may not be polymerized yet or may be partially polymerized. The free surface of the RM layer may be a surface exposed to the outside environment during the polymerization process, or an interface between the RM layer and the outside environment during the polymerization process. The RM layer may also have another surface that is opposite to the free surface, and in contact with the alignment structure. The polymerized RM layer may be referred to as a layer of RMs after the polymerization process.

Figure 3D:
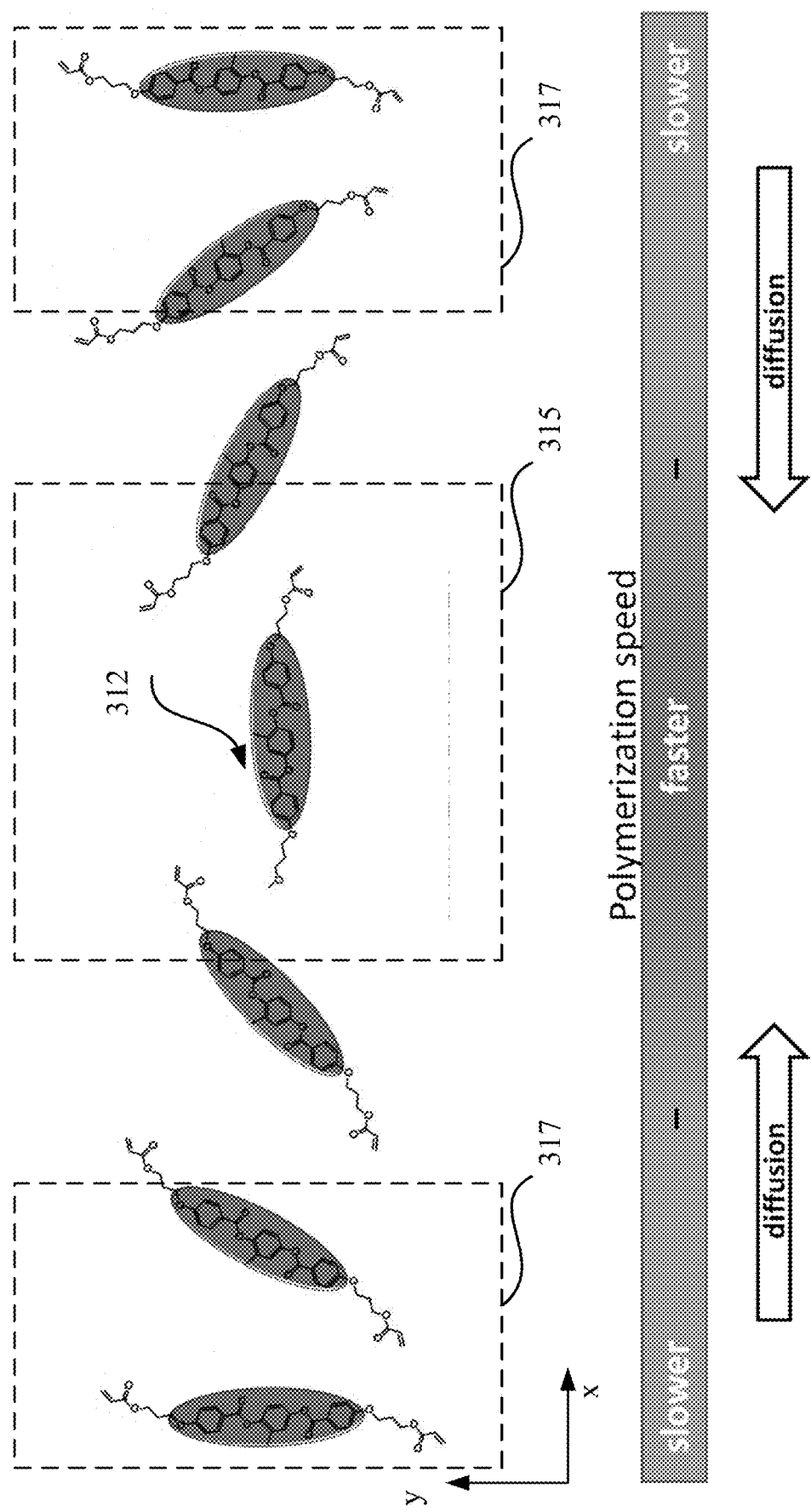
FIG. 3D illustrates a diagram of a portion of optically anisotropic molecules located in close proximity to or at a free surface of a birefringent medium layer during a photo-polymerization process.

FIG. 3D illustrates a diagram of an x-y sectional view of a portion of RM molecules 312 located in close proximity to or at the free surface of the RM layer during the photo-polymerization process. RM monomers are liquid crystalline mesogens containing reactive end groups that are mutually polymerizable under the UV light illumination. The chemical structure of the RM molecule 312 may be composed of a mesogenic core group and photopolymerizable end groups. The core group may include a calamitic or a discotic liquid crystalline monomer. The end groups may include polymerizable groups that are mutually polymerizable under the UV light illumination, e.g., acrylic groups, or methacrylic groups, etc. For discussion purposes, FIG. 3D shows that the RM molecule 312 includes a core group that is a calamitic liquid crystalline monomer, and end groups that are acrylic groups. The photo-polymerization process of the RM monomers is a free-radical polymerization process. The photo-initiators generate free radicals under the UV irradiation, and the RM monomers are linked to the free radicals at the ends of the polymer chain, thereby growing the polymer chain.

As shown in FIG. 3D, the RM molecules 312 located in close proximity to or at the free surface of the RM layer are aligned in a grating pattern. The periodicity direction of the grating pattern may be along the first predetermined (or x-axis) in-plane direction. FIG. 3D illustrates the x-axis in-plane orientations of the RM molecules 312 within a region corresponding to a single in-plane pitch. Under the UV irradiation, the RM molecules 312 that are aligned substantially in the first predetermined (or x-axis) in-plane direction may react faster to be crosslinked than the RM molecules 312 that are aligned substantially in the second predetermined (or y-axis) in-plane direction. Thus, the photo-polymerization process may be faster in a region 315 in which the RM molecules 312 are aligned substantially in the first predetermined (or x-axis) in-plane direction than in a region 317 in which the RM molecules 312 are aligned substantially in the second predetermined (or y-axis) in-plane direction. The speed of the photo-polymerization process may gradually decrease from the region 315 to the region 317. Thus, more unreacted RM monomers may be diffused to the region 315 than to the region 317, resulting in the anisotropic diffusion of the RM monomers at the free surface of the RM layer and/or in regions that are in close proximity to the free surface.

Thus, the amount of RM monomers may gradually decrease from the region 315 to the region 317, such that after the photo-polymerization process, the wavy structures may be formed at the free surface of the polymerized RM layer. For example, a relatively large amount of RM monomers may be accumulated and crosslinked in the region 315 forming the peaks 305 of the wavy structures. A relatively small amount of RM monomers may be accumulated and crosslinked in the region 317, forming the valleys 307 of the wavy structures. The wavy structures shown in FIGS. 3A-3C may also be formed during a thermal-polymerization process of RMs.

According to the formation mechanism of the wavy structures discussed in FIG. 3D, a free surface of a polymerized RM layer configured with an in-plane orientation pattern may exhibit similar wavy structures. The polymerized RM layer may be included in an LCPH element, e.g., a PBP element, a PVH element, etc., which may be fabricated based on surface alignment and polymerization similar to the fabrication processes shown in FIGS. 2A-2C. For example, the free surface of a polymerized RM layer included in a PVH grating may also exhibit wavy structures with periodically spaced peaks and valleys, similar to that shown in FIGS. 3A-3C. Similarly, in an LCPH element functioning as an LCPH lens, the free surface of a polymerized RM layer in which the RM molecules are aligned in an in-plane orientation pattern corresponding to a lens pattern may exhibit wavy structures with non-periodically spaced peaks and valleys. The LCPH lens may be a PBP lens, a PVH lens, etc. The lens pattern may be similar to that shown in FIGS. 1C and 1D.

Figure 3E:
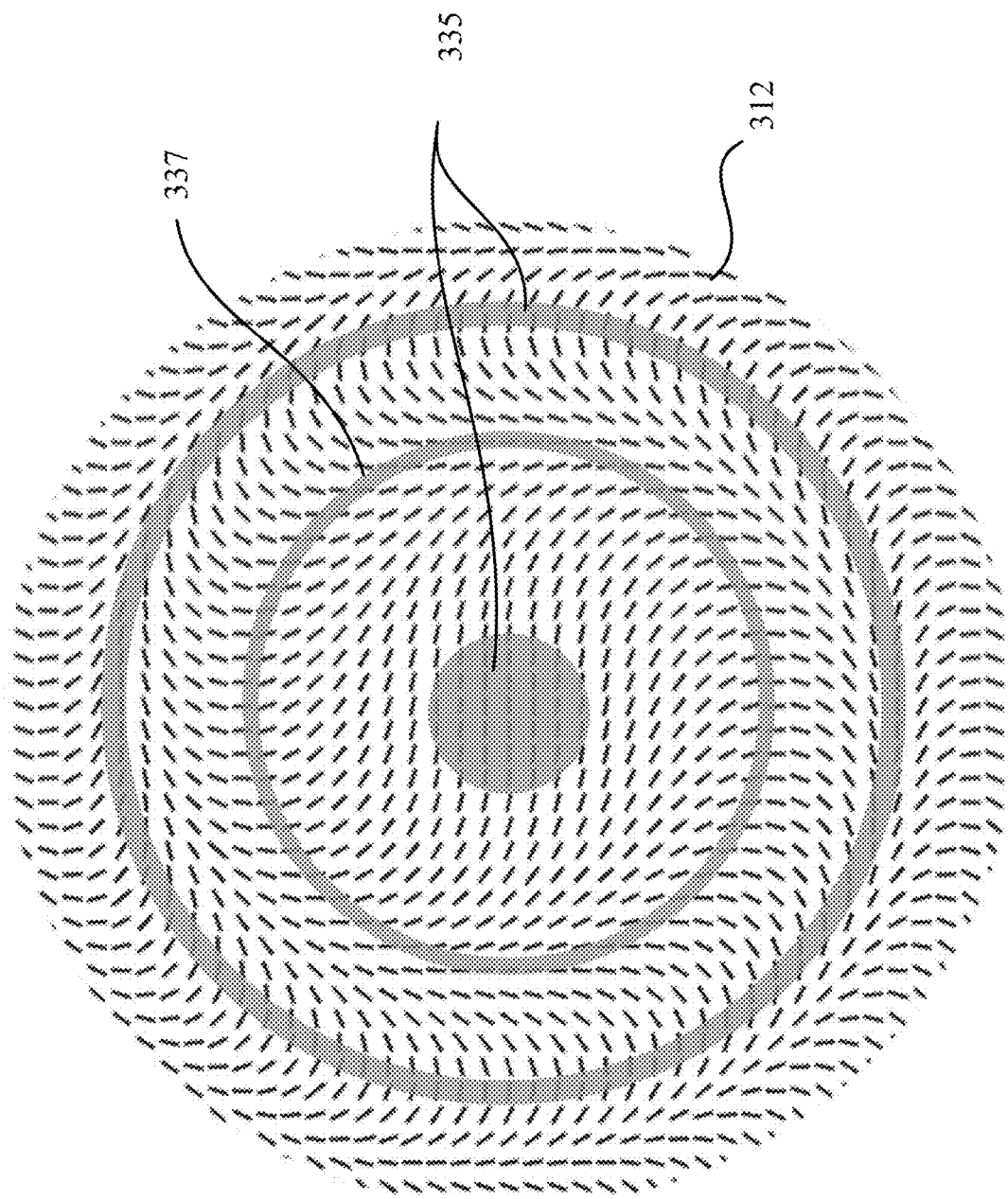
FIG. 3E illustrates a diagram showing a superimposition of optically anisotropic molecules and wavy structures of an LCP layer.

FIG. 3E illustrates a diagram showing an x-y sectional view of a superimposition of optically anisotropic molecules 312, e.g., RM molecules, and the wavy structures of an LCP layer, e.g., a polymerized RM layer. The RM molecules 312 may be aligned in an in-plane orientation pattern corresponding to a lens pattern. A free surface of the polymerized RM layer may exhibit concentric wavy structures with non-periodically spaced peaks and valleys. As shown in FIG. 3E, peaks 335 of the wavy structures may correspond to (or overlap with) the regions of the polymerized RM layer in which the RM molecules 312 that are substantially aligned in the first predetermined (e.g., x-axis) in-plane direction of the polymerized RM layer, and valleys 337 of the wavy structures may correspond to (or overlap with) the regions of the polymerized RM layer in which the RM molecules 312 that are substantially aligned in the second predetermined (e.g., y-axis) in-plane direction. The period of the wavy structures may vary (e.g., decrease) from a center of the concentric wavy structures to an edge of the concentric wavy structures. The period of the wavy structures may be substantially the same as the corresponding in-plane pitch of the in-plane orientation pattern of the RM molecules 312.

Figure 4A:
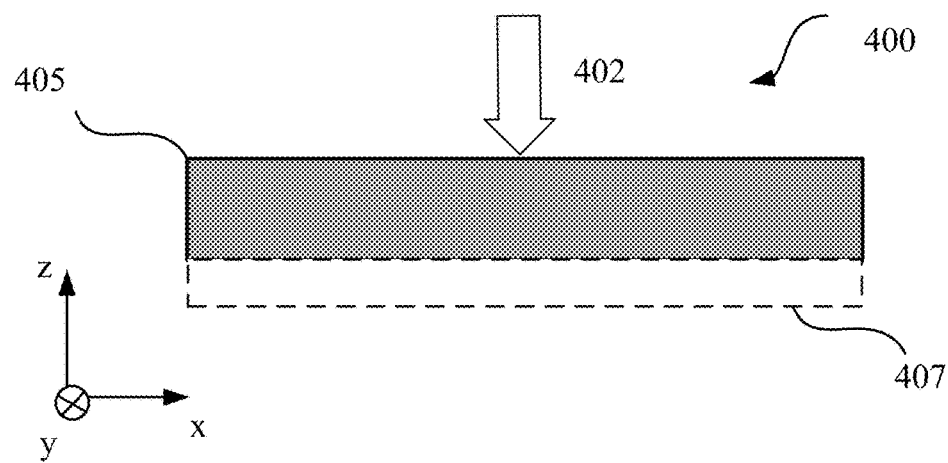
FIG. 4A schematically illustrates a diagram of a Pancharatnam-Berry phase ("PBP") grating without wavy structures, according to theoretical configuration.
Figure 4B:
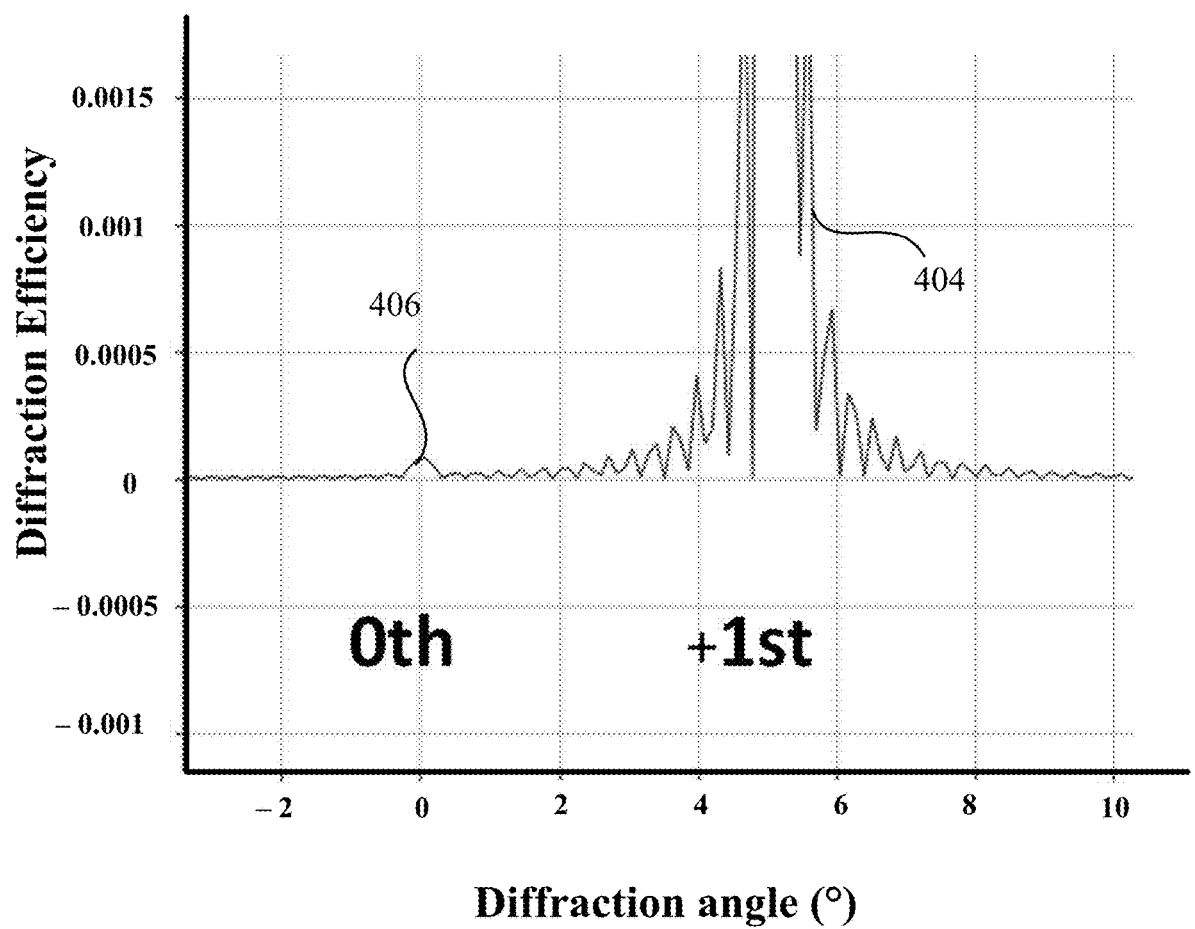
FIG. 4B illustrates simulation results showing relationships between diffraction angle and diffraction efficiency of the PBP grating shown in FIG. 4A.

Inventors have studied the influence of the wavy structures on the optical performance of an LCPH element. FIG. 4A illustrates an x-z sectional view of a PBP grating 400 including a polymerized RM layer 405 without wavy structures at its free surface, according to a theoretical configuration. FIG. 4B illustrates simulation results showing relationships between diffraction angle and diffraction efficiency of the PBP grating 400 for the circularly polarized light 402. As shown in FIG. 4A, both of an upper surface and a lower surface of the polymerized RM layer 405 may be fully flat surfaces. In practice, the surfaces may not be fully flat, but may have wavy structures with a height smaller than a predetermined height. Wavy structures with the height smaller than the predetermined height may not cause adverse optical effects, and hence may be regarded as being flat. The PBP grating 400 may be configured to substantially diffract a circularly polarized light having a first handedness, and substantially transmit (with negligible diffraction) a circularly polarized light having a second handedness that is opposite to the first handedness. A circularly polarized light 402 having the first handedness is normally incident onto the upper surface of the polymerized RM layer 405. In the simulation, the in-plane pitch of the PBP grating 400 is presumed to be 6 µm, the wavelength of the circularly polarized light 402 is presumed to be 532 nm, and the height of air 407 in contact with the lower surface of the polymerized RM layer 405 is presumed to be 1 µm.

As shown in FIG. 4B, the horizontal axis represents the diffraction angle (unit: degree)) (° of a light diffracted by the PBP grating 400, and the vertical axis represents the diffraction efficiency of the light diffracted by the PBP grating 400. The PBP grating 400 may diffract the circularly polarized light 402 to a $+1^{st}$ diffraction order 404 with a diffraction efficiency of about 0.9991 (not shown in FIG. 4B), and a $0^{th}$ diffraction order 406 with a diffraction efficiency less than 0.0001. The $0^{th}$ diffraction order 406 may be an undesirable diffraction order, which may be considered as a noise. The $+1^{st}$ diffraction order 404 may be considered as a signal. The signal-to-noise ratio of the PBP grating 400 for the circularly polarized light 402 may be calculated as 9991 (0.9991/0.0001=9991).

Figure 4C:
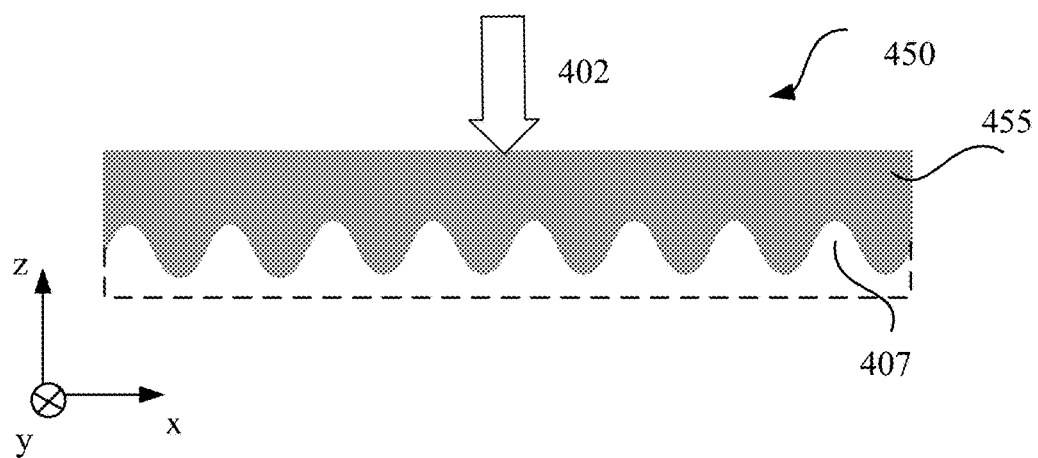
FIG. 4C schematically illustrates a diagram of a PBP grating with wavy structures.
Figure 4D:
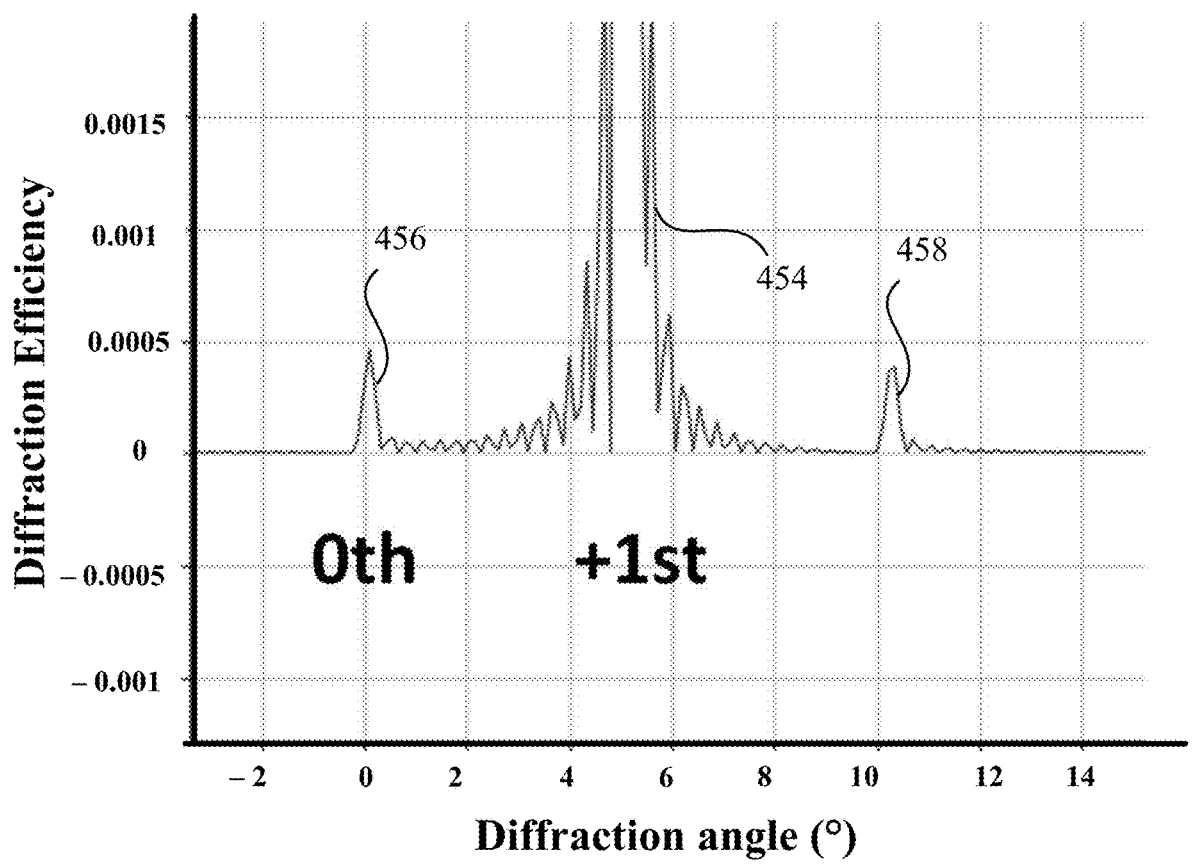
FIG. 4D illustrates simulation results showing relationships between diffraction angle and diffraction efficiency of the PBP grating shown in FIG. 4C.

FIG. 4C illustrates an x-z sectional view of a PBP grating 450 including a polymerized RM layer 455 with wavy structures. FIG. 4D illustrates simulation results showing relationships between diffraction angle and diffraction efficiency of the PBP grating 450 for the circularly polarized light 402. As shown in FIG. 4C, an upper surface of the polymerized RM layer 455 may be a flat surface, and a lower surface of the polymerized RM layer 455 may be a wavy surface, similar to that shown in FIGS. 3A and 3B. The PBP grating 450 may be configured to substantially diffract a circularly polarized light having the first handedness, and substantially transmit (with negligible diffraction) a circularly polarized light having the second handedness. The circularly polarized light 402 having the first handedness is normally incident onto the upper surface of the polymerized RM layer 455. In the simulation, the period of the wavy structures is presumed to be 6 µm, and the height of the wavy structures is presumed to be 15 nm. The in-plane pitch of the PBP grating 450 is presumed to be 6 µm, the wavelength of the circularly polarized light 402 is presumed to be 532 nm, and the height of the air 407 in contact with the lower surface (that is the wavy surface) of the polymerized RM layer 405 is presumed to be 1 µm.

As shown in FIG. 4D, the horizontal axis represents the diffraction angle (unit: degree)) (° of a light diffracted by the PBP grating 450, and the vertical axis represents the diffraction efficiency of the light diffracted by the PBP grating 450. The PBP grating 450 may diffract the circularly polarized light 402 to a +1$^{st}$ diffraction order 454, and two additional, undesirable diffraction orders 456 and 458. The diffraction efficiency of the +1$^{st}$ diffraction order 454 is about 0.9889 (not shown in FIG. 4B). The diffraction efficiency of the undesirable diffraction order (e.g., 0$^{th}$ diffraction order) 456 is about 0.0005, and the diffraction efficiency of the undesirable diffraction order 458 is about 0.0004. When taking both of the undesirable diffraction orders 456 and 458 into consideration, the signal-to-noise ratio of the PBP grating 450 for the circularly polarized light 402 may be calculated as 1099 (0.9889/0.0009=1099). When only taking the undesirable diffraction order (e.g., 0$^{th}$ diffraction order) 456 into consideration, the signal-to-noise ratio of the PBP grating 450 for the circularly polarized light 402 may be calculated as 1978 (0.9889/0.0005=1978).

Referring to FIGS. 4A and 4B and FIGS. 4C and 4D, the diffraction efficiency of the +1$^{st}$ diffraction order 454 output from the PBP grating 450 with wavy structures is reduced by about 0.0102 (about 1%) as compared to the diffraction efficiency of the +1$^{st}$ diffraction order 404 output from the PBP grating 400 without the wavy structures. When taking both of the undesirable diffraction orders 456 and 458 into consideration, the signal-to-noise ratio of the PBP grating 450 for the circularly polarized light 402 is reduced by a factor of 9 (9991/1099=9.09) as compared to the signal-to-noise ratio of the PBP grating 400 for the circularly polarized light 402. When only taking the undesirable diffraction order (e.g., 0$^{th}$ diffraction order) 456 into consideration, the signal-to-noise ratio of the PBP grating 450 for the circularly polarized light 402 is reduced by a factor of 5 (9991/1978=5.05) as compared to the signal-to-noise ratio of the PBP grating 400 for the circularly polarized light 402.

Compared to the diffraction efficiency of the +1$^{st}$ diffraction order 404 output from the PBP grating 400, and the signal-to-noise ratio of the PBP grating 400, although the diffraction efficiency of the +1$^{st}$ diffraction order 454 output from the PBP grating 450 with wavy structures is only reduced by about 0.0102 (about 1%), the signal-to-noise ratio of the PBP grating 450 may be reduced by a factor of at least 5. When the PBP grating 450 is implemented into an optical device or system, the optical performance of the optical device or system may be significantly degraded, as compared to the optical performance of the optical device or system including the PBP grating 400 without wavy structures. For example, when the PBP grating 450 with wavy structures is implemented into an imaging device, the contrast ratio of the imaging device including the PBP grating 450 with wavy structures may be reduced by a factor of at least 5, as compared to the contrast ratio of an imaging device including the PBP grating 400 without wavy structures.

Figure 4E:
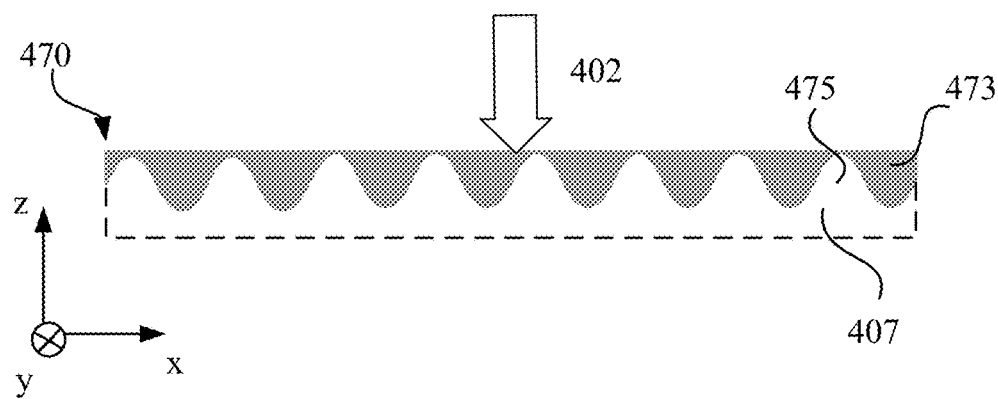
FIG. 4E schematically illustrates a diagram of wavy structures.
Figure 4F:
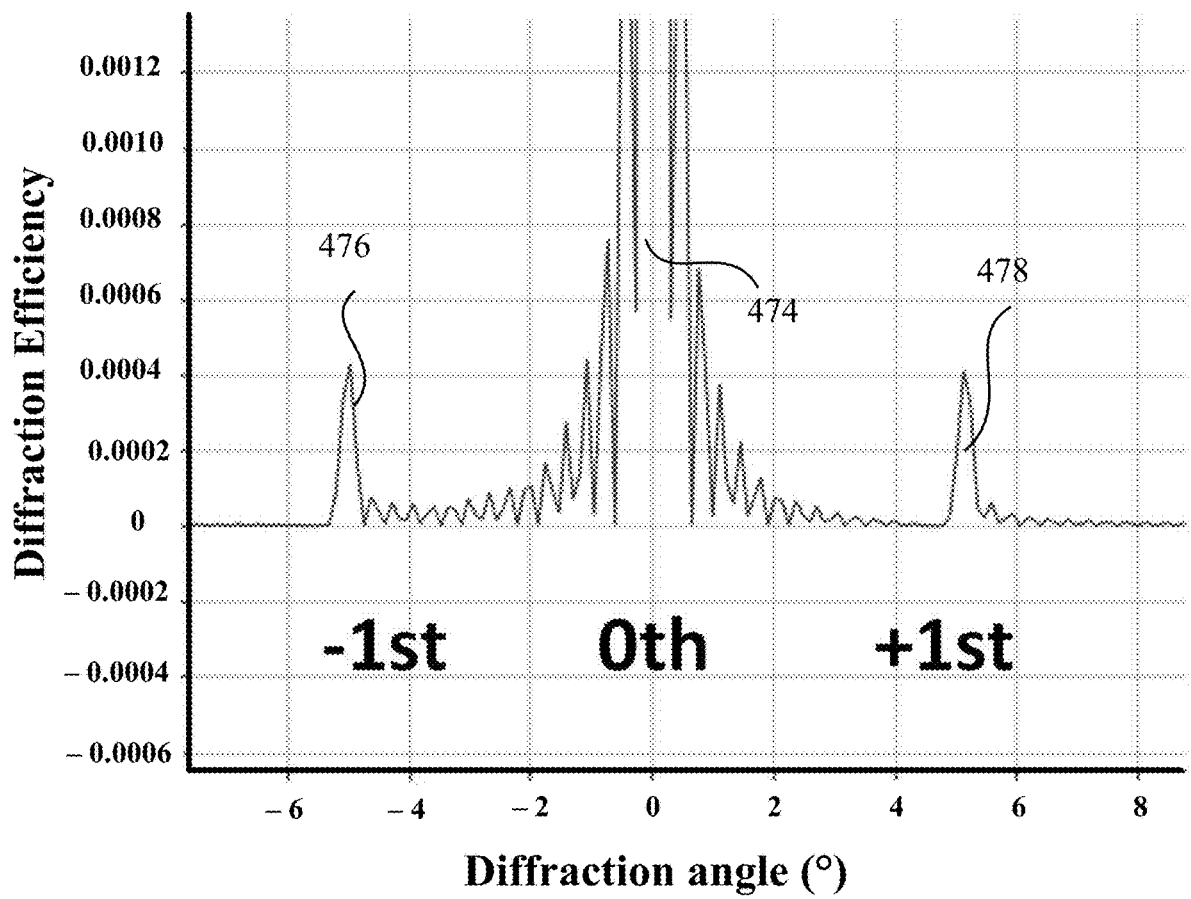
FIG. 4F illustrates simulation results showing relationships between diffraction angle and diffraction efficiency of the wavy structures shown in FIG. 4E.

Referring back to FIG. 4C, inventors have observed that the wavy structures at the free surface of the polymerized RM layer 455 may be considered as a surface relief grating ("SRG"). The SRG may also diffract the circularly polarized light 402, resulting in the reduction of the diffraction efficiency of the +1$^{st}$ diffraction order of the PBP grating 450. FIG. 4E illustrates an x-z sectional view of wavy structures 470 that may be formed at the free surface of the polymerized RM layer 455 shown in FIG. 4C. FIG. 4F illustrates simulation results showing relationships between diffraction angle and diffraction efficiency of the SRG 470 for the circularly polarized light 402. As shown in FIG. 4E, the wavy structures 470 may function as an SRG (also referred to as 470 for discussion purposes). The SRG 470 may include a plurality of microstructures 473 defining or forming a plurality of grooves 475. The microstructures may be formed by polymerized RMs. An upper surface of the SRG 470 may be a flat surface, and a lower surface of the SRG 470 may be a wavy surface, similar to that shown in FIGS. 3A and 3B. The circularly polarized light 402 having the first handedness is normally incident onto the upper surface of the SRG 470. In the simulation, the period of the wavy structures 470 is presumed to be 6 µm, and the height of the wavy structures 470 is presumed to be 15 nm. The wavelength of the circularly polarized light 402 is presumed to be 532 nm. The height of the air 407 in contact with the lower surface (that is the wavy surface) of the wavy structures 470 is presumed to be 1 µm.

As shown in FIG. 4F, the horizontal axis represents the diffraction angle (unit: degree)) (° of lights diffracted by the SRG 470, and the vertical axis represents the diffraction efficiency of the lights diffracted by the SRG 470. The SRG 470 may diffract the circularly polarized light 402 to a 0$^{th}$ diffraction order 454, a +1$^{st}$ diffraction order 478, and a −1$^{st}$ diffraction order 476. The diffraction efficiency of the 0$^{th}$ diffraction order 454 may be about 0.9508. The diffraction efficiency of each of the +1$^{st}$ diffraction order 478 and the −1$^{st}$ diffraction order 476 may be about 0.0095 (about 1%).

As discussed above, the diffraction efficiency of the +1$^{st}$ diffraction order 454 output from the PBP grating 450 with wavy structures is reduced by about 1%, as compared to the diffraction efficiency of the +1$^{st}$ diffraction order 404 output from the PBP grating 400 without wavy structures. The reduction (about 1%) of the diffraction efficiency of the +1$^{st}$ diffraction order 454 output from the PBP grating 450 may result from the +1$^{st}$ diffraction order 478 and the −1$^{st}$ diffraction order 476 output from the SRG 470.

FIGS. 3A-4F illustrate the wavy structures that are formed at a free surface of an LCP layer, e.g., polymerized RM layer, which may be included in an LCPH element such as a PBP element, or a PVH element, etc. The fabrication processes of such an LCPH element may include surface alignment and polymerization, e.g., those similar to the fabrication processes shown in FIGS. 2A-2C. In some embodiments, the fabrication process of an LCPH element may include volume alignment in a photo-sensitive polymer. Similar wavy structures may exist at a free surface of the photo-sensitive polymer.

Figure 5A:
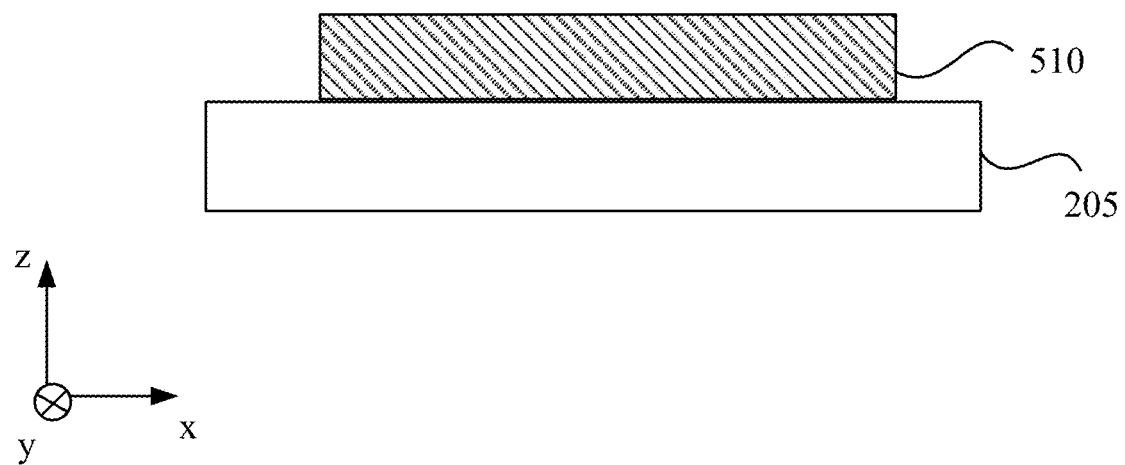
FIGS. 5A and 5B schematically illustrate processes for fabricating an LCPH element, according to an embodiment of the present disclosure.
Figure 5B:
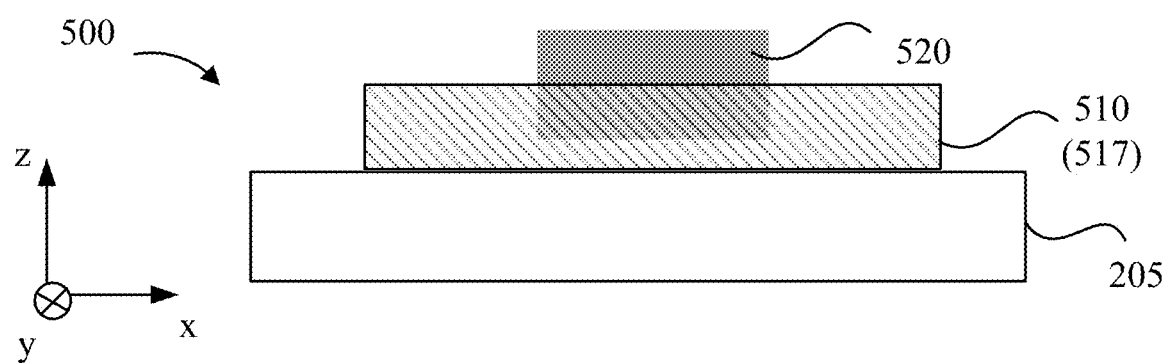

FIGS. 5A and 5B schematically illustrate processes for fabricating an LCPH element, according to an embodiment of the present disclosure. The processes shown in FIGS. 5A and 5B may include dispensing a photo-sensitive polymer on a surface, such as a top surface, of the substate 205 to form a photo-sensitive polymer layer 510. The dispensing may be coating, depositing, ink-jet printing, etc. In some embodiments, the photo-sensitive polymer may be mixed with other ingredients, such as photo-sensitizers and a solvent in which the photo-sensitive polymer may be dissolved to form a solution. The solution may be dispensed on the substate 205 using a suitable process, e.g., spin coating, slot coating, blade coating, spray coating, or jet (ink-jet) coating or printing. The solvent may be removed from the coated solution using a suitable process, e.g., drying, or heating, leaving the photo-sensitive polymer on the substate 205.

After the photo-sensitive polymer layer 510 is formed on the substate 205, as shown in FIG. 5B, the photo-sensitive polymer layer 510 may be exposed to a polarized light irradiation 520. In some embodiments, the polarized light irradiation 520 may have a substantially uniform intensity, and 3D spatially varying orientations (or polarization directions) of linear polarizations within a predetermined space in which the photo-sensitive polymer layer 510 is disposed. That is, the polarized light irradiation 520 may provide a 3D polarization field within the predetermined space in which the photo-sensitive polymer layer 510 is disposed. In some embodiments, the polarized light irradiation 520 may include a polarization interference pattern generated based on two coherent, circularly polarized beams with opposite handednesses. The photo-sensitive polymer layer 510 may be optically patterned when exposed to the polarization interference pattern during the polarization interference exposure process. An orientation pattern of an optic axis of the photo-sensitive polymer layer 510 in an exposed region may be defined during the polarization interference exposure process.

Molecules of the photo-sensitive polymer may include one or more polarization sensitive photo-reactive groups embedded in a main polymer chain or a side polymer chain. During the polarized light irradiation process of the photo-sensitive polymer layer 510, a photo-alignment of the polarization sensitive photo-reactive groups may occur within (or inside) a volume of the photo-sensitive polymer layer 510. Thus, a 3D polarization field provided by the polarized light irradiation 520 may be directly recorded within (or inside) the volume of the photo-sensitive polymer layer 510. In other words, the photo-sensitive polymer layer 510 may be optically patterned to form a patterned photo-sensitive polymer layer (referred to as 517 in FIG. 5B for discussion purpose). Such an alignment procedure shown in FIG. 5B may be referred to as a bulk-mediated photo-alignment. The photo-sensitive polymer included in the photo-sensitive polymer layer 510 for a bulk-mediated photo-alignment shown in FIG. 5B may also be referred to as a volume recording medium or bulk PAM. The photo-sensitive polymer layer 510 for a bulk-mediated photo-alignment shown in FIG. 5B may be relatively thicker than the PAM layer (e.g., 210) for a surface-mediated photo-alignment shown in FIGS. 2A-2C.

In some embodiments, the photo-sensitive polymer included in the photo-sensitive polymer layer 510 may include an amorphous polymer, an LC polymer, etc. The molecules of the photo-sensitive polymer may include one or more polarization sensitive photo-reactive groups embedded in a main polymer chain or a side polymer chain. In some embodiments, the polarization sensitive photo-reactive group may include an azobenzene group, a cinnamate group, or a coumarin group, etc. In some embodiments, the photo-sensitive polymer may be an amorphous polymer, which may be initially optically isotropic prior to undergoing the polarized light irradiation 520, and may exhibit an induced (e.g., photo-induced) optical anisotropy after being subjected to the polarized light irradiation 520. In some embodiments, the photo-sensitive polymer may be an LC polymer, in which the birefringence and in-plane orientation pattern may be recorded due to an effect of photo-induced optical anisotropy. In some embodiments, the photo-sensitive polymer may be an LC polymer with a polarization sensitive cinnamate group embedded in a side polymer chain. In some embodiments, when the photo-sensitive polymer layer 510 includes an LC polymer, the patterned photo-sensitive polymer layer 517 may be heat treated (e.g., annealed) in a temperature range corresponding to a liquid crystalline state of the LC polymer to enhance the photo-induced optical anisotropy of the LC polymer (not shown in FIG. 5B).

Thus, as FIG. 5B shows, an LCPH element (e.g., an LCPH grating) 500 may be obtained. In some embodiments, the LCPH element 500 fabricated based on the fabrication processes shown in FIGS. 5A and 5B may be a passive LCPH element, e.g., a passive PBP element, a passive PVH element, etc. In some embodiments, the passive LCPH element may be a transmissive LCPH element (e.g., a PBP element, a transmissive PVH element, etc.).

Referring to FIG. 5B, the patterned photo-sensitive polymer layer 517 may have an upper surface exposed to an outside environment during the polarized light irradiation process, and a lower surface in contact with the substate 205. The upper surface exposed to the outside environment during the polarized light irradiation process may be referred to as a free surface of the patterned photo-sensitive polymer layer 517. The free surface of the patterned photo-sensitive polymer layer 517 may also exhibit wavy structures with periodically or non-periodically spaced peaks and valleys, e.g., similar to those shown in FIGS. 3A-3E. Similarly, compared to an LCPH element including a patterned photo-sensitive polymer layer without wavy structures, the diffraction efficiency of the LCPH element 500 including the patterned photo-sensitive polymer layer 517 with wavy structures may be reduced, and the signal-to-noise ratio of the LCPH element 500 including the patterned photo-sensitive polymer layer 517 with wavy structures may be significantly reduced.

According to the above discussions, when fabricating a polarization hologram polymer layer in which optically anisotropic molecules located in close proximity to or at a free surface of the polarization hologram polymer layer are configured with spatially varying orientations in at least one in-plane direction, without controlling or configuring the formulation of a birefringent medium or a photo-sensitive polymer used for forming the polarization hologram polymer layer as disclosed herein, wavy structures are typically formed at the free surface of the polarization hologram polymer layer. The wavy structures may significantly degrade the optical performance of an LCPH element including the polarization hologram polymer layer. For example, for a PBP element or PVH element, the wavy structures may result in scattering and/or undesirable diffraction orders, and/or reduce the diffraction efficiency of a desirable diffraction order. Thus, a signal-to-noise ratio of the PBP element or PVH element may be reduced. The wavy structures may lower the Modulation Transfer Function ("MTF") or resolution of an optical device including the PBP element or PVH element. For example, the MTF or resolution of a light guide display system including the PVH element with wavy structures may be reduced.

Figure 6A:
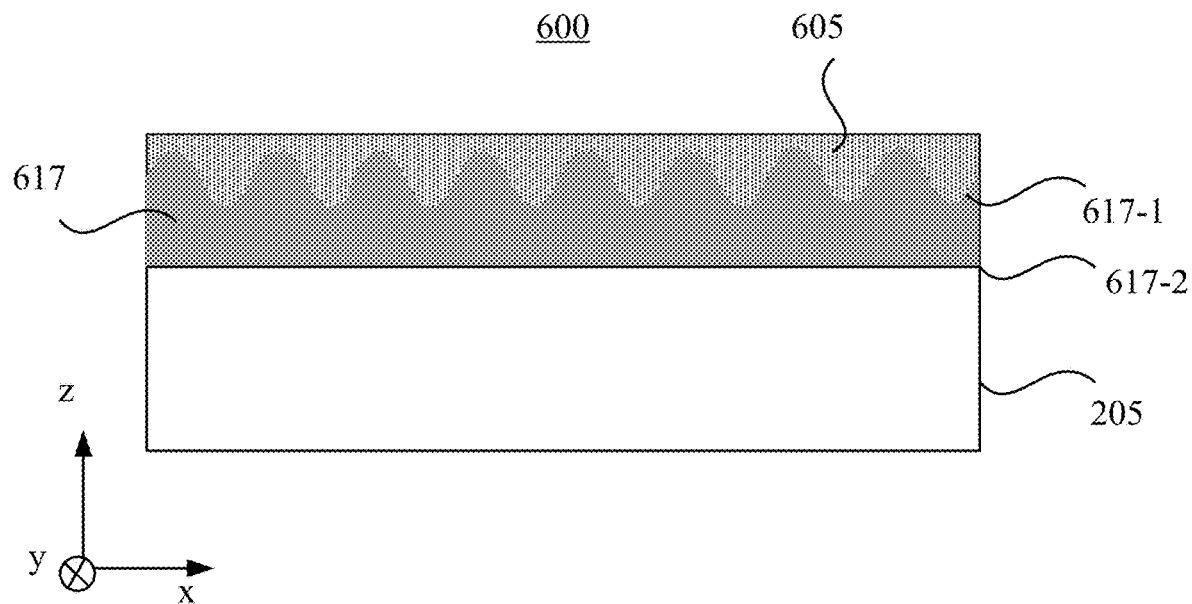
FIG. 6A schematically illustrates a diagram of an optical device including a compensation layer configured to flatten the wavy structures at a surface, according to an embodiment of the present disclosure.

In view of the performance degradation caused by the wavy structures at the surface of the polarization hologram polymer layer, the present disclosure provides an optical device including compensated wavy structures. FIG. 6A schematically illustrates an x-z sectional view of an optical device 600 with a compensation layer configured to flatten the wavy structures at a surface, according to an embodiment of the present disclosure. The optical device 600 may be an LCPH device. For example, the optical device 600 may be a PBP or PVH device, such as a PBP or PVH grating, a PBP or PVH lens (e.g., a spherical lens, a cylindrical lens, or a freeform lens, etc.), or a PBP or PVH prism, etc. The optical device 600 shown in FIG. 6A may include elements that are the same as or similar to those included in the LCPH element 100 shown in FIGS. 1A-1H, the LCPH element 200 fabricated based on the fabrication processes shown in FIGS. 2A-2C, or the LCPH element 500 fabricated based on the fabrication processes shown in FIGS. 5A and 5B. Detailed descriptions of the same or similar elements may refer to the above descriptions rendered in connection with FIGS. 1A-1H, FIGS. 2A-2C, or FIGS. 5A and 5B.

As shown in FIG. 6A, the optical device 600 may include the substate 205, a polarization hologram polymer layer 617 (also referred to as polymer layer 617), and a compensation layer (or film) 605 stacked in an optical series. An optic axis of the polymer layer 617 may be configured with a spatially varying orientation in at least one in-plane direction. For example, the optic axis of the polymer layer 617 may periodically or non-periodically vary in at least one in-plane linear direction, at least one in-plane radial direction, at least one in-plane circumferential (e.g., azimuthal) direction, or a combination thereof. In some embodiments, the polymer layer 617 may be an LCP layer. In some embodiments, the LCP layer may include polymerized (or cross-linked) LCs, polymer-stabilized LCs, an LC polymer, or any combination thereof. The LCs may include nematic LCs, twist-bend LCs, chiral nematic LCs, smectic LCs, or any combination thereof. In some embodiments, the polymer layer 617 may include a photo-sensitive polymer layer, such as an amorphous polymer layer.

In some embodiments, the optical device 600 may include additional elements. For example, in some embodiments, the optical device 600 may include an alignment structure (not shown) disposed between the substate 205 and the polymer layer 617. The alignment structure may be similar to the alignment structure 210 shown in FIGS. 2A-2C. The alignment structure 210 and the polymer layer 617 may be fabricated on the substate 205 based on, e.g., the fabrication process shown in FIGS. 2A-2C. In some embodiments, the optical device 600 may not include an alignment structure, and the polymer layer 617 may be fabricated on the substrate 205 based on, e.g., the fabrication process shown in FIGS. 5A and 5B.

The polymer layer 617 may have the first surface 617-1 that is an interface between the polymer layer 617 and the compensation layer 605, and the second surface 617-2 that is an interface between the polymer layer 617 and the alignment structure 210. The first surface 617-1 of the polymer layer 617 may exhibit wavy structures, which may be formed, e.g., during a polymerization process due to an anisotropic diffusion of monomers at a surface exposed to an outside environment. The wavy structures may have peaks and valleys alternately distributed in the at least one in-plane direction. In some embodiments, the period of the wavy structures may be substantially the same as the in-plane pitch of the in-plane orientation pattern of the optically anisotropic molecules (e.g., RM molecules). For example, when the in-plane orientation pattern of the optically anisotropic molecules has a constant in-plane pitch, the period of the wavy structures may be substantially constant. When the in-plane orientation pattern of the optically anisotropic molecules has a varying in-plane pitch, the period of the wavy structures may be varying, and may be substantially the same as the corresponding in-plane pitch of the in-plane orientation pattern. For discussion purposes, in the embodiment shown in FIG. 6A, the optic axis of the polymer layer 617 may periodically vary in at least one in-plane direction. In other words, the orientations of the directors of the optically anisotropic molecules (e.g., RM molecules) may periodically or change in at least one in-plane direction (e.g., the x-axis direction shown in FIG. 6A). FIG. 6A shows that the wavy structures may have peaks and valleys that are periodically and alternately distributed in at least one in-plane direction (e.g., the x-axis direction shown in FIG. 6A), similar to that shown in FIGS. 3A-3C. In some embodiments, an average height of the wavy structure may be determined, in part, by the in-plane pitch of the in-plane orientation pattern of the polymer layer 617 and the thickness of the polymer layer 617. The average height of the wavy structures may be in nanometer scale, e.g., within a range of about 10 nm-30 nm.

The compensation layer 605 may be disposed over the wavy structures of the polymer layer 617, and configured to compensate for the wavy structures of the polymer layer 617. In some embodiments, as shown in FIG. 6A, the compensation layer 605 may be in direct contact with the wavy structures, and may at least fill the grooves (or valleys) of the wavy structures to flatten or planarize the wavy structures, such that the surface of the overall optical device 600 may be flat, rather than wavy. In some embodiments, the compensation layer 605 may at least fill the grooves (or valleys) of the wavy structures to reduce the average height of the wavy structures to be smaller than a predetermined value. The wavy structures with the average height smaller than the predetermined height may not cause adverse optical effects. In some embodiments, as shown in FIG. 6D, in an optical device 680 with a compensation layer 685 configured to flatten the wavy structures at a surface, the compensation layer 685 may flatten or planarize the wavy structures located at the first surface 617-1 of the polymer layer 617, and the overall outer surface of the optical device 680 may not be flat. The outer surface of the compensation layer 685 facing the outside environment may be a non-flat surface, e.g., may be a curved surface.

The polymer layer 617 (or the birefringent medium forming the polymer layer 617) may have an ordinary refractive index of $n_o$, and an extraordinary refractive index of $n_e$. An average refractive index of the polymer layer 617 may be calculated as $n_{p\text{-}average}=(n_e+n_o)/2$. In some embodiments, the compensation layer 605 may be an optically isotropic layer, with a refractive index of $n_c$. In some embodiments, a difference between the refractive index $n_c$ of the compensation layer 605 and a refractive index $n_a$ of an outside environment (e.g., air, $n_a\approx1$) of the optical device 600 may be configured to be less than a difference between the average refractive index $n_{p\text{-}average}$ of the polymer layer 617 and the refractive index $n_a$ of the outside environment of the optical device 600. Thus, undesirable optical effects caused by the wavy structures (functioning similar to an SRG placed in the outside environment), e.g., diffraction, scattering, resolution reduction, and/or MTF reduction, etc., may be reduced.

In some embodiments, the refractive index $n_c$ of the compensation layer 605 may be substantially the same as the average refractive index $n_{p\text{-}average}$ of the polymer layer 617. In such an embodiment, the compensation layer 605 may also be referred to as a refractive index matching layer. A light incident onto an interface between the wavy structures of the polymer layer 617 and the compensation layer 605 (e.g., the surface 617-1) may not be subjected to a refractive index change and, thus, may be transmitted through with negligible deflection. Thus, the undesirable optical effects caused by the wavy structures (functioning similar to an SRG placed in the outside environment), e.g., diffraction, scattering, resolution reduction, MTF reduction, etc., may be significantly reduced.

In some embodiments, the compensation layer 605 may be an optically anisotropic layer. For example, the compensation layer 605 may have $n_x$ and $n_y$ that are principal refractive indices in orthogonal directions at a film plane (e.g., an x-y plane in FIG. 6A), and $n_z$ that is a principal refractive index in an out-of-plane vertical direction (e.g., a z-direction in FIG. 6A), which is also referred to as the refractive index in the film thickness direction. An average refractive index of the compensation layer 605 may be calculated as $n_{c\text{-}average}=(n_x+n_y)/2$. In some embodiments, a difference between the average refractive index $n_{c\text{-}average}$ of the compensation layer 605 and a refractive index $n_a$ of an outside environment (e.g., air, of the optical device 600 may be configured to be less than a difference between the average refractive index $n_{p\text{-}average}$ of the polymer layer 617 and the refractive index $n_a$ of the outside environment of the optical device 600. Thus, undesirable optical effects caused by the wavy structures (functioning similar to an SRG placed in the outside environment), e.g., diffraction, scattering, resolution reduction, and/or MTF reduction, etc., may be significantly reduced.

In some embodiments, the average refractive index $n_{c\text{-}average}$ of the compensation layer 605 may be substantially the same as the average refractive index $n_{p\text{-}average}$ of the polymer layer 617. In such an embodiment, the compensation layer 605 may also be referred to as a refractive index matching layer. A light incident onto an interface between the wavy structures of the polymer layer 617 and the compensation layer 605 (e.g., the surface 617-1) may not be subjected to a refractive index change and, thus, may be transmitted through with negligible deflection. Thus, the undesirable optical effects caused by the wavy structures (functioning similar to an SRG placed in the outside environment), e.g., diffraction, scattering, resolution reduction, and/or MTF reduction, etc., may be significantly reduced.

In some embodiments, the compensation layer 605 may be optically transparent at least in an operation wavelength range of the polymer layer 617. In some embodiments, the compensation layer 605 may be transparent in the visible wavelength band (e.g., about 380 nm to about 700 nm). In some embodiments, the compensation layer 605 may be at least partially transparent in at least a portion of the infrared IR band (e.g., about 700 nm to about 1 mm). The compensation layer 605 may include any suitable material with a suitable optical transparency and a suitable refractive index (or average refractive index). In some embodiments, the compensation layer 605 may include an optically clear adhesive ("OCA"). The OCA may be featured with re-workability, good adhesion to uneven surfaces, superior optical properties and durability as compared to other adhesives. In some embodiments, the compensation layer 605 may be formed on the wavy structures of the polymer layer 617 through, applying a liquid OCA to the polymer layer 617 (e.g., coating a liquid OCA layer on the wavy surface of the polymer layer 617), and curing the liquid OCA layer through, e.g., ambient or elevated temperatures, UV or visible lights, high energy radiations, moisture reducing techniques, or a combination thereof, depending on the manufacturer and specifications. In some embodiments, the OCA may also function as an optical bonding between the polymer layer 617 and another element (e.g., another optical element, another electro-optical element). For example, the polymer layer 617 may be bonded to another element through, applying the liquid OCA to the polymer layer 617, attaching the polymer layer 617 with the liquid OCA to another element, and curing the liquid OCA layer. In some embodiments, the compensation layer 605 may include a birefringent medium and may function as an A-plate, an O-plate, or a C-plate, etc.

Figure 6B:
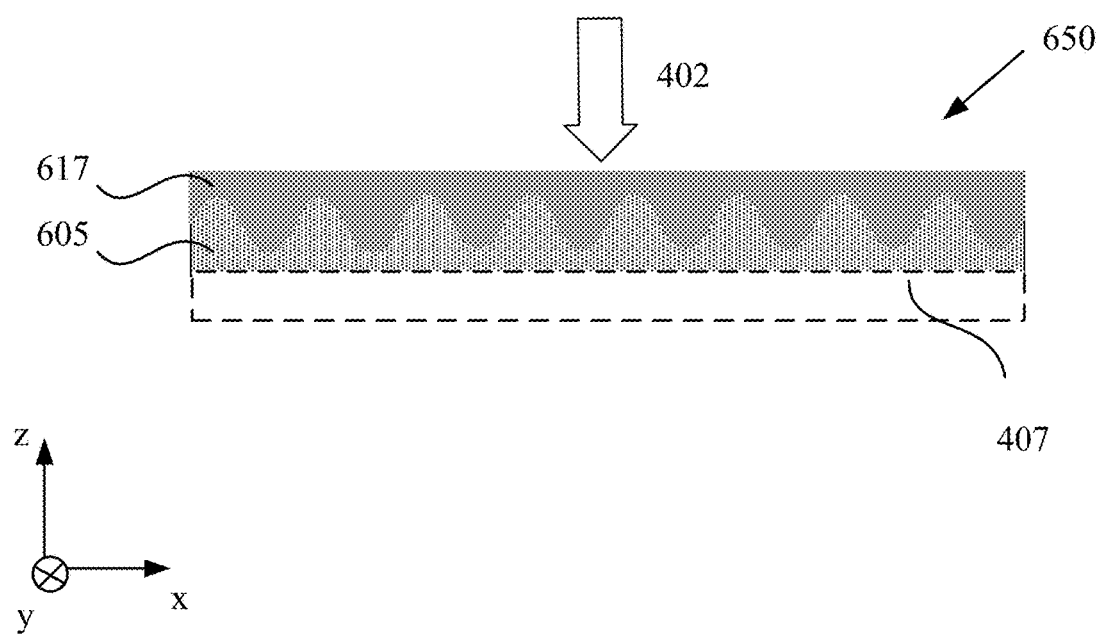
FIG. 6B schematically illustrates a diagram of a PBP grating including a compensation layer configured to flatten the wavy structures, according to an embodiment of the present disclosure.
Figure 6C:
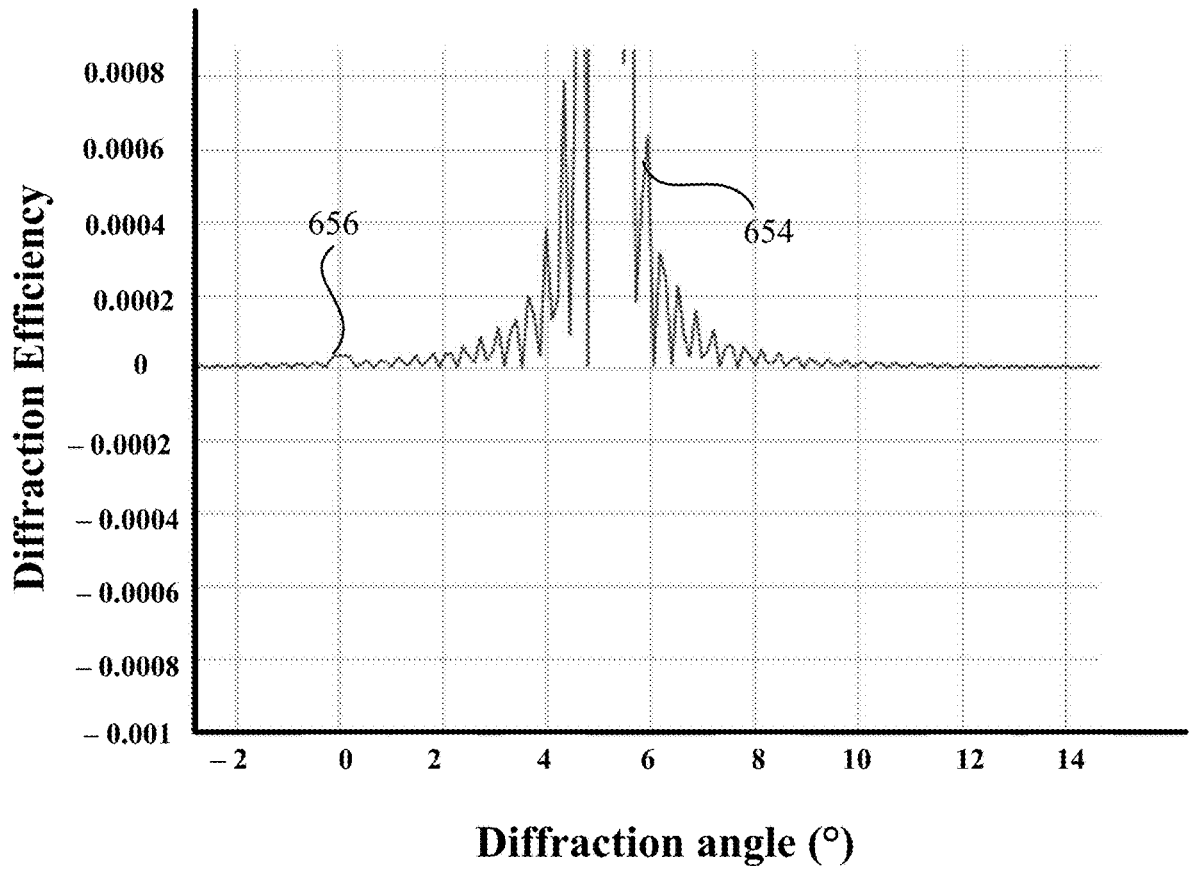
FIG. 6C illustrates simulation results showing relationships between diffraction angle and diffraction efficiency of the PBP grating shown in FIG. 6B, according to an embodiment of the present disclosure.
Figure 6D:
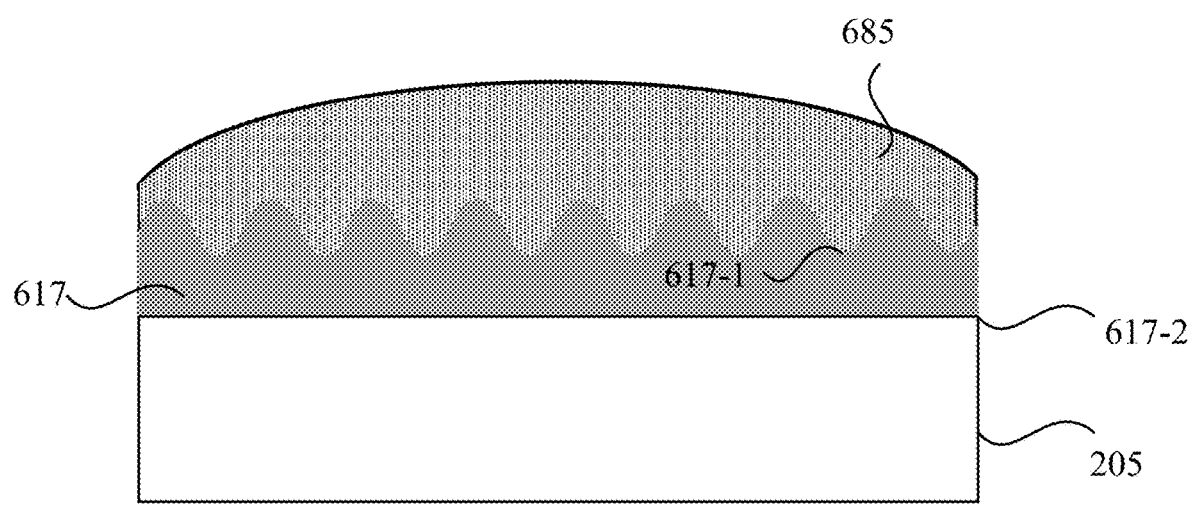
FIG. 6D schematically illustrates a diagram of a PBP grating including a compensation layer configured to flatten the wavy structures, according to an embodiment of the present disclosure.

FIG. 6B illustrates an x-z sectional view of a PBP grating 650 with wavy structures compensated for by a compensation layer, according to an embodiment of the present disclosure. FIG. 6C illustrates simulation results showing relationships between the diffraction angle and diffraction efficiency of the PBP grating 650 for the circularly polarized light 402. As shown in FIG. 6B, the PBP grating 650 may include the polymer layer 617 with wavy structures at a surface and the compensation layer 605 disposed at the surface to compensate for the wavy structures, thereby reducing undesirable optical effects caused by the wavy structures. An upper surface of the polymer layer 617 may be a flat surface, and a lower surface of the polymer layer 617 may be a wavy surface, similar to that shown in FIGS. 3A and 3B. The PBP grating 650 may be configured to substantially diffract a circularly polarized light having a predetermined handedness, and substantially transmit (with negligible diffraction) a circularly polarized light having a handedness that is opposite to the predetermined handedness. For illustrative purposes, the circularly polarized light 402 having the predetermined handedness is normally incident onto the upper surface of the polymer layer 617. In the simulation, the average period of the wavy structures is presumed to be 6 μm, and the average height of the wavy structures is presumed to be 15 nm. The in-plane pitch of the PBP grating 650 is presumed to be 6 μm, the wavelength of the circularly polarized light 402 is presumed to be 532 nm, and the height of the air 407 in contact with the lower surface of the compensation layer 605 is presumed to be 1 μm. The refractive index of the compensation layer 605 matches with the average refractive index of the polymer layer 617.

As shown in FIG. 6C, the horizontal axis represents the diffraction angle (unit: degree)) (° of a light diffracted by the PBP grating 650, and the vertical axis represents the diffraction efficiency of the light diffracted by the PBP grating 650. The PBP grating 650 may diffract the circularly polarized light 402 to a $+1^{st}$ diffraction order 654 with a diffraction efficiency of about 0.999 (not shown in FIG. 6C), and a $0^{th}$ diffraction order 656 with a diffraction efficiency less than 0.0001. The signal-to-noise ratio of the PBP grating 650 for the circularly polarized light 402 may be calculated as 9999 (0.9999/0.0001=9999).

Referring to FIGS. 4C-4D and FIGS. 6B-6C, the simulation results shown in FIG. 4D and FIG. 6C show that the effects caused by the wavy structures, e.g., extra diffraction orders, diffraction efficiency reduction, etc., may be compensated for, or suppressed by, the compensation layer 605 included in the PBP grating 650. For example, for the circularly polarized light 402, the diffraction efficiency (e.g., 0.999) of the $+1^{st}$ diffraction order 654 of the PBP grating 650 with the compensated wavy structures may be increased as compared to the diffraction efficiency (e.g., 0.9889) of the $+1^{st}$ diffraction order 454 of the PBP grating 450 with the uncompensated wavy structures. The $+0^{th}$ order diffraction in the PBP grating 650 with the compensated wavy structures may be significantly suppressed. For example, the diffraction efficiency (e.g., less than 0.0001) of the $+0^{th}$ diffraction order 656 of the PBP grating 650 with the compensated wavy structures may be significantly decreased as compared to the diffraction efficiency (e.g., about 0.0005) of the $0^{th}$ diffraction order 456 of the PBP grating 450 with the uncompensated wavy structures. Accordingly, the signal-to-noise ratio of the PBP grating 650 with the compensated wavy structures may be significantly improved as compared to the signal-to-noise ratio of the PBP grating 450 with the uncompensated wavy structures. For example, the signal-to-noise ratio of the PBP grating 650 may be improved at least by a factor of 5 as compared to the signal-to-noise ratio of the PBP grating 450.

Referring to FIGS. 4A-4B and FIGS. 6B-6C, the simulation results shown in FIG. 4B and FIG. 6C show that the PBP grating 650 with the compensated wavy structures may have substantially the same optical performance as the PBP grating 400 without wavy structures at its surface. For example, for the circularly polarized light 402, the diffraction efficiency (e.g., 0.999) of the +1$^{st}$ diffraction order 654 of the PBP grating 650 with the compensated wavy structures may be substantially the same as the diffraction efficiency (e.g., 0.9991) of the +1$^{st}$ diffraction order 454 of the PBP grating 400 without wavy structures. The diffraction efficiency (e.g., less than 0.0001) of the +0$^{th}$ diffraction order 656 of the PBP grating 650 with the compensated wavy structures may be substantially the same as the diffraction efficiency (e.g., about 0.0001) of the 0$^{th}$ diffraction order 456 of the PBP grating 400 without wavy structures. The signal-to-noise ratio of the PBP grating 650 may be substantially the same as the signal-to-noise ratio of the PBP grating 450.

The present disclosure also provides a method to fabricate an LCPH element with predetermined wavy structures (or a predetermined wavy surface). Inventors have observed that the heights of the wavy structures may be affected by the formulation of the birefringent medium and the polymerization process of the birefringent medium. For example, referring to FIG. 2C, inventors have conducted a series of experiments, and observed that the heights of the wavy structures at the free surface of the LCP layer (e.g., the polymerized RM layer) 217 may be determined, in part, by the speed of the polymerization process of the birefringent medium (e.g., RM monomers). In some embodiments, a faster polymerization process of polymerizable LC monomers (e.g., RM monomers) may result in smaller heights for the wavy structures at the free surface of the polymerized LCP (e.g., the polymerized RM layer) 217. This is because when the polymerization process of the RM monomers speeds up, there may be less time for the RM monomers located in close proximity to, or at a free surface of, an RM layer to diffuse anisotropically during the polymerization process. Thus, the anisotropic diffusion of the RM monomers located in close proximity to, or at the free surface of, the RM layer during the polymerization process may be suppressed, and the average height of the wavy structures formed at the free surface of the polymerized RM layer 217 may be reduced. In some embodiments, the polymerization process of the birefringent medium may be sped up via, increasing the concentration of the photo-initiators included in the birefringent medium, increasing the intensity of the UV light 244 used in the photo-polymerization process of the birefringent medium, and/or increasing the temperature at which the photo-polymerization or thermal-polymerization process of the birefringent medium is performed, etc.

Inventors have conducted a series of experiments to study the influences of the concentration of the photo-initiators included in the birefringent medium, the intensity of the UV light 244 used in the photo-polymerization process of the birefringent medium, and the temperature at which the polymerization process of the birefringent medium is performed on the wavy structures. Inventors have observed that, within a predetermined rage of the concentration of the photo-initiators included in the birefringent medium, as the concentration of the photo-initiators increases, the heights of the wavy structures formed at the free surface of the polymerized RM layer 217 may decrease. For example, experimental results show that when the concentration of the photo-initiators included in the birefringent medium is 2.5%, 5.5%, and 8.5%, the average height of the wavy structures formed at the free surface of the polymerized RM layer 217 is about 35.4 nm, 12.1 nm, and 3.2 nm, respectively. Within a predetermined rage of the intensity of the UV light 244 used in the photo-polymerization process of the birefringent medium, as the intensity of the UV light 244 increases, the heights of the wavy structures formed at the free surface of the polymerized RM layer 217 may decrease. Within a predetermined rage of the temperature at which the photo-polymerization process of the birefringent medium is performed, as the temperature increases, the heights of the wavy structures formed at the free surface of the polymerized RM layer 217 may decrease.

Inventors have also observed that the heights of the wavy structures formed at the free surface of the LCP layer (e.g., polymerized RM layer) 217 may be determined, in part, by the polarization of the UV light 244 used in the photo-polymerization process of the birefringent medium (e.g., RM monomers). Inventors have conducted a series of experiments to study the influence of the polarization of the UV light 244 on the wavy structures. Inventors have observed that when the UV light 244 is a linearly polarized light having a polarization direction that is parallel to the in-plane direction (or the direction of the in-plane pitch) of the in-plane orientation pattern of the RM molecules in the RM layer, the average height $h_1$ of the wavy structures formed at the free surface of the polymerized RM layer 217 may be relatively small. When the UV light 244 is a linearly polarized light having a polarization direction that is perpendicular to the in-plane direction (or the direction of the in-plane pitch) of the in-plane orientation pattern of the RM molecules in the RM layer, the average height $h_2$ of the wavy structures formed at the free surface of the polymerized RM layer 217 may be relatively large, e.g., greater than $h_1$. When the UV light 244 is an unpolarized light, the average height $h_3$ of the wavy structures formed at the free surface of the polymerized RM layer 217 may be less than the average height $h_2$ and greater than the average height $h_1$. For example, experimental results show that when the polarization of the UV light 244 used in the photo-polymerization process of the birefringent medium (e.g., RM monomers) varies, the average heights $h_1$, $h_2$, $h_3$ of the wavy structures formed at the free surface of the polymerized RM layer 217 are about 21.75 nm, 33.62 nm, and 39.79 nm, respectively.

For discussion purposes, the concentration of the initiators included in the birefringent medium, the exposure intensity (e.g., the intensity of the UV light) and exposure polarization (e.g., the polarization of the UV light) used in the polymerization process of the birefringent medium, and the temperature used in the polymerization process of the birefringent medium may be referred to as polymerization parameters used in the polymerization process of the birefringent medium. In some embodiments, the polymerization parameters used in the polymerization process of the birefringent medium may include other parameters, such as the concentration of the monomers included in the birefringent medium, the time duration of the polymerization process of the birefringent medium, etc. Thus, through configuring the polymerization parameters used in the polymerization process of the birefringent medium, wavy structures with a predetermined or predefined height may be formed at the free surface of the polymer layer included in the LCPH element. For example, by configuring polymerization parameters used in the polymerization process of the birefringent medium, the average height of the wavy structures at the free surface of the polymer layer may be controlled to be smaller than a specified height (e.g., less than 30 nm). As another example, in some embodiments, the heights of the wavy structures may be controlled to follow predetermined distribution profile. For some applications, the wavy structures may be desired to be highly suppressed, and compensated by a compensation layer (e.g., the compensation layer 605 shown in FIG. 6A). For some other applications, the wavy structures may be desired to be enhanced, such as following a predetermined wavy distribution profile.

The present disclosure also provides a method for fabricating an LCPH element with compensated wavy structures, such as a PBP element or a PVH element with compensated wavy structures. FIG. 9A is a flowchart illustrating a method 1000 for fabricating an LCPH element with compensated wavy structures, according to an embodiment of the present disclosure. As shown in FIG. 9A, the method 1000 may include providing a polarization hologram polymer layer having a wavy surface and an optic axis configured with a spatially varying orientation in a first predetermined in-plane direction (step 1010). The polarization hologram polymer layer may be fabricated by any suitable processes, such as the fabrication process shown in FIGS. 2A-2C, or the fabrication process shown in FIGS. 5A and 5B, or other suitable processes. The polarization hologram polymer layer may include optically anisotropic molecules, and orientation of the optically anisotropic molecules may vary in the first predetermined in-plane direction. In some embodiments, the polarization hologram polymer layer may be a polarization hologram LCP layer. In some embodiments, the LCP layer may include at least one of polymerized liquid crystals or a liquid crystal polymer. In some embodiments, the polarization hologram polymer layer may be a photo-sensitive polymer layer. In some embodiments, the polarization hologram polymer layer may include an amorphous polymer.

In some embodiments, providing the polarization hologram polymer layer may include forming a layer of a birefringent medium with the optically anisotropic molecules on an alignment structure, and polymerizing the layer of the birefringent medium to form the polarization hologram polymer layer. In some embodiments, providing the polarization hologram polymer layer may include forming a layer of a photo-sensitive polymer on a surface of a substrate, and exposing the layer of the photo-sensitive polymer to a polarized light irradiation. The polarized light irradiation may have 3D spatially varying orientations (or polarization directions) of linear polarizations within a predetermined space in which the layer of the photo-sensitive polymer is disposed.

The polarization hologram polymer layer may have a wavy surface including peaks and valleys alternately spaced in the first predetermined in-plane direction. The peaks of the wavy surface may correspond to first regions (of the polymer, or the wavy surface) in which the optically anisotropic molecules are substantially aligned in the first predetermined in-plane direction. The valleys of the wavy surface may correspond to second regions (of the polymer, or the wavy surface) in which the optically anisotropic molecules are substantially aligned in a second predetermined in-plane direction that is perpendicular to the first predetermined in-plane direction. Detailed descriptions of the polarization hologram polymer layer, the wavy structures, and the fabrication processes of the polarization hologram polymer layer may refer to the descriptions rendered above, e.g., including those rendered in connection with FIGS. 1A-5B.

The method 1000 may also include forming a compensation layer over the wavy surface of the polarization hologram polymer layer to compensate for the wavy surface in shape (step 1020). In some embodiments, forming the compensation layer over the wavy surface may include applying a layer of a liquid OCA to the wavy surface of the polarization hologram polymer layer, and curing the layer of the liquid OCA. The liquid OCA may fill the grooves (or valleys) of the wavy surface to flatten or planarize the wavy surface. The liquid OCA may be solidified to be the compensation layer after curing.

In some embodiments, an average refractive index of the polarization hologram polymer layer may be $n_{p\text{-}average}=(n_e+n_o)/2$, $n_o$ and $n_e$ being an ordinary refractive index and an extraordinary refractive index of the polarization hologram polymer layer, respectively. In some embodiments, the compensation layer may be an optically isotropic layer with refractive index of $n_c$. In some embodiments, a difference between the refractive index $n_c$ and a refractive index $n_a$ of an outside environment of the device may be less than a difference between the average refractive index $n_{p\text{-}average}$ and the refractive index $n_a$. In some embodiments, the average refractive index $n_{c\text{-}average}$ of the compensation layer may be substantially the same as the average refractive index $n_{p\text{-}average}$ of the polarization hologram polymer layer. In some embodiments, the compensation layer may be an optically anisotropic layer, an average refractive index $n_{c\text{-}average}$ of the compensation layer being $(n_x+n_y)/2$, $n_x$ and $n_y$ being principal refractive indices in orthogonal directions at a film plane of the compensation layer. In some embodiments, a difference between the average refractive index $n_{c\text{-}average}$ and a refractive index $n_a$ of an outside environment of the device may be less than a difference between the average refractive index $n_{p\text{-}average}$ and the refractive index $n_a$.

The present disclosure also provides a method for fabricating an LCPH element including wavy structures of a predefined height, such as a PBP element or a PVH element with compensated wavy structures. FIG. 9B is a flowchart illustrating a method 1050 for fabricating an LCPH element including wavy structures of a predefined height, according to an embodiment of the present disclosure. As shown in FIG. 9B, the method 1050 may include determining one or more relationships between an average height of a wavy surface of a testing polarization hologram polymer layer and one or more polymerization parameters (step 1060). The method 1050 may also include determining one or more values of the one or more polymerization parameters that render the average height of the wavy surface of the testing polarization hologram polymer layer to be a predetermined average height (step 1070). The method 1050 may further include fabricating a final polarization hologram polymer layer using a polymerization process based on the determined one or more values of the one or more polymerization parameters (step 1080). The final polarization hologram polymer layer may have a wavy surface with the predetermined average height.

In each of the testing polarization hologram polymer layer and the final polarization hologram polymer layer (collectively referred to as a "polarization hologram polymer layer"), an optic axis of the polarization hologram polymer layer may have a spatially varying orientation in a first predetermined in-plane direction. In some embodiments, the polarization hologram polymer layer may include optically anisotropic molecules, and the orientations of the optically anisotropic molecules may vary in the first predetermined in-plane direction. The wavy surface may include peaks and valleys alternately spaced in the first predetermined in-plane direction. The peaks may correspond to first regions of the wavy surface in which the optically anisotropic molecules are substantially aligned in the first predetermined in-plane direction, and the valleys may correspond to second regions of the wavy surface in which the optically anisotropic molecules are substantially aligned in a second predetermined in-plane direction that is perpendicular to the first predetermined in-plane direction.

The one or more polymerization parameters may include a concentration of initiators included in a birefringent medium that forms the testing polarization hologram polymer layer via a polymerization process, an exposure intensity (e.g., an intensity of a UV light) used in the polymerization process of the birefringent medium, an exposure polarization (e.g., a polarization of the UV light) used in the polymerization process of the birefringent medium, and an exposure temperature used in the polymerization process of the birefringent medium. In some embodiments, the polymerization parameters used in the polymerization process of the birefringent medium may include other parameters, such as a concentration of monomers included in the birefringent medium, a time duration of the polymerization process of the birefringent medium, etc.

For example, determining the one or more relationships may include determining a respective relationship between the average height of the wavy surface of the testing polarization hologram polymer layer and the respective polymerization parameter. For example, the one or more relationships may include a first relationship between the average height of the wavy surface of the testing polarization hologram polymer layer and the concentration of initiators included in a birefringent medium, a second relationship between the average height of the wavy surface of the testing polarization hologram polymer layer and the exposure intensity, a third relationship between the average height of the wavy surface of the testing polarization hologram polymer layer and the exposure polarization, and/or a fourth relationship between the average height of the wavy surface of the testing polarization hologram polymer layer and the exposure temperature.

In some embodiments, determining the one or more relationships may include performing data simulation and/or physical experiments to determine how the average height of the wavy surface in the testing polarization hologram polymer layer changes when the one or more polymerization parameters are adjusted. In some embodiments, determining the one or more relationships may also include performing data simulation and/or physical experiments to determine how a surface profile of the wavy surface of the testing polarization hologram polymer layer change when the one or more polymerization parameters are adjusted.

In some embodiments, the method may also include determining one or more values of the one or more polymerization parameters that render the wavy surface of the testing polarization hologram polymer layer to have a predetermined surface profile. In some embodiments, the method may also include determining one or more values of the one or more polymerization parameters that render the wavy surface to have a predetermined average height. In some embodiments, the fabricated final polarization hologram polymer layer may have a wavy surface with the predetermined average height. In some embodiments, the fabricated final polarization hologram polymer layer may have the wavy surface with the predetermined surface profile.

The fabrication process of a polarization hologram polymer layer (e.g., the testing polarization hologram polymer layer or the final polarization hologram polymer layer) may include forming a birefringent medium layer on a substrate provided with an alignment structure. Forming the birefringent medium layer on the substate may include formulating a birefringent medium solution using the birefringent medium and the initiators based on the determined concentration of the initiators, and applying (e.g., depositing, coating, etc.) the birefringent medium solution to a substate. The fabrication process may also include polymerizing the birefringent medium based on other determined polymerization parameters, such as the exposure intensity, the exposure polarization, and/or the exposure temperature, etc.

The LCPH devices or elements with the compensated wavy structures disclosed herein have the following features: reduced undesirable diffraction orders, reduced scattering, small thickness (about 1 um), light weight, compactness, large aperture, simple fabrication, etc. The LCPH devices with the compensated wavy structures disclosed herein may be implemented in systems or devices for imaging, sensing, communication, biomedical applications, etc. Beam steering devices based on the disclosed LCPH devices with the compensated wavy structures may be implemented in various systems for augmented reality ("AR"), virtual reality ("VR"), and/or mixed reality ("MR") applications, e.g., near-eye displays ("NEDs"), head-up displays ("HUDs"), head-mounted displays ("HMDs"), smart phones, laptops, televisions, vehicles, etc. For example, beam steering devices based on the disclosed LCPH devices with the compensated wavy structures may be implemented in displays and optical modules to enable pupil steered AR, VR, and/or MR display systems, such as holographic near eye displays, retinal projection eyewear, and wedged waveguide displays. Pupil steered AR, VR, and/or MR display systems have features such as compactness, large field of views ("FOVs"), high system efficiencies, and small eyeboxes. Beam steering devices based on the disclosed LCPH devices with the compensated wavy structures may be implemented in the pupil steered AR, VR, and/or MR display systems to enlarge the eye-box spatially and/or temporally. In some embodiments, beam steering devices based on the disclosed LCPH devices with the compensated wavy structures may be implemented in AR, VR, and/or MR sensing modules to detect objects in a wide angular range to enable other functions.

In some embodiments, beam steering devices based on the disclosed LCPH devices with the compensated wavy structures may be implemented in AR, VR, and/or MR sensing modules to extend the FOV or detecting range of the sensors in space constrained optical systems, increase detecting resolution or accuracy of the sensors, and/or reduce the signal processing time. Beam steering devices based on the disclosed LCPH devices with the compensated wavy structures may also be used in Light Detection and Ranging ("Lidar") systems, which may be used in autonomous vehicles. Beam steering devices based on the disclosed LCPH devices with the compensated wavy structures may also be used in optical communications, e.g., to provide fast speeds at the level of Gigabyte/second and long ranges at kilometer levels. Beam steering devices based on the disclosed LCPH devices with compensated wavy structures may also be implemented in microwave communications, 3D imaging and sensing, lithography, and 3D printing, etc.

Imaging devices based on the disclosed LCPH devices with the compensated wavy structures may be implemented in various systems for AR, VR, and/or MR applications, enabling light-weight and ergonomic designs for AR, VR, and/or MR devices. For example, imaging devices based on the disclosed LCPH devices with the compensated wavy structures may be implemented in displays and optical modules to enable smart glasses for AR, VR, and/or MR applications, compact illumination optics for projectors, light-field displays. Imaging devices based on the disclosed LCPH devices with the compensated wavy structures may replace conventional objective lenses having a high numerical aperture in microscopes. Imaging devices based on the disclosed LCPH devices with the compensated wavy structures may be implemented into light source assemblies to provide a polarized structured illumination to a sample, for identifying various features of the sample. Imaging devices based on the disclosed LCPH devices with the compensated wavy structures may enable polarization patterned illumination systems that add a new degree for sample analysis.

Figure 7:
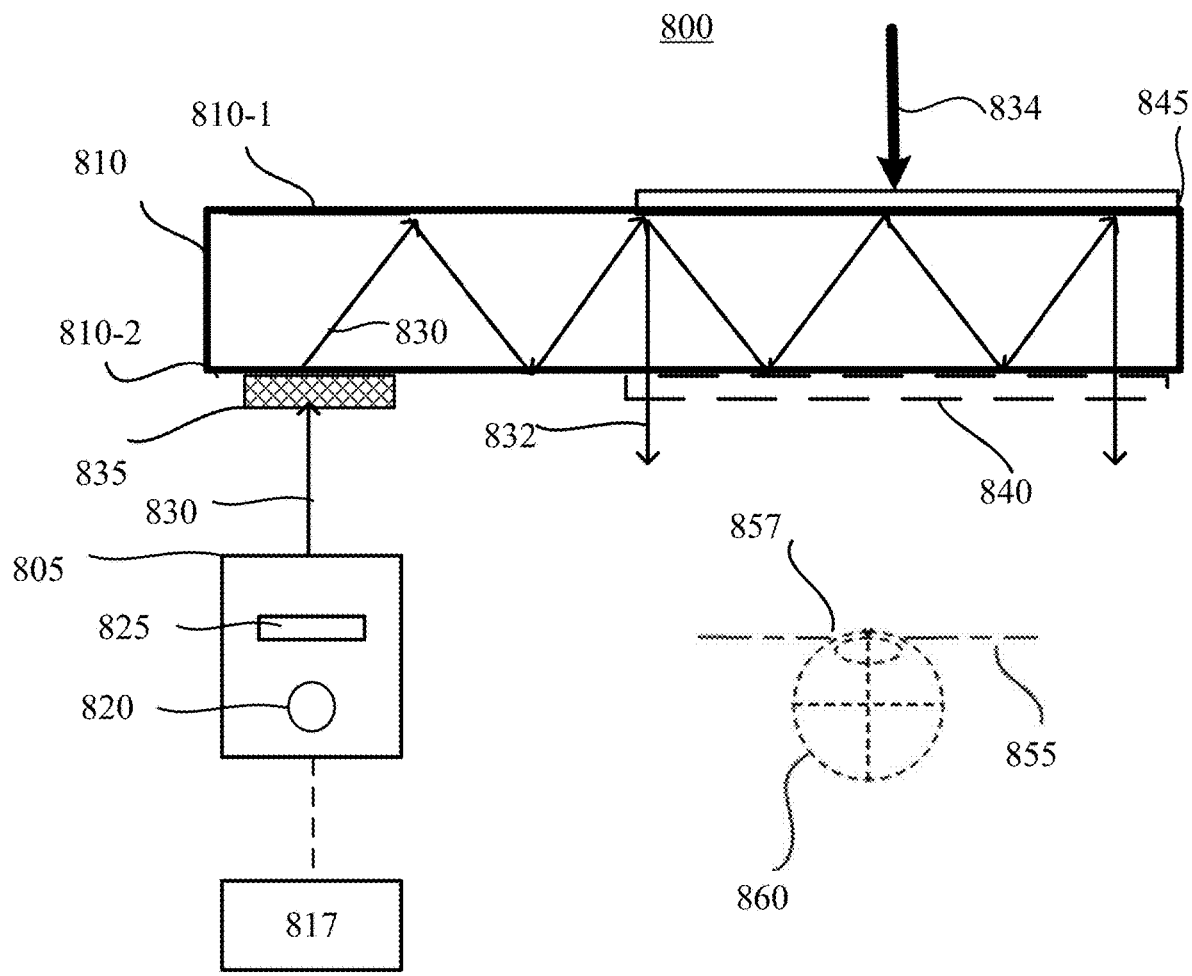
FIG. 7 illustrates a schematic diagram of a light guide display system, according to an embodiment of the present disclosure.
Figure 7:
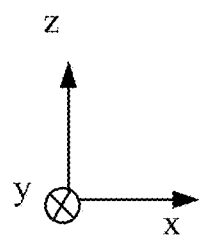

Some exemplary applications in AR, VR, or MR fields or some combinations thereof will be explained below. FIG. 7 illustrates an x-z sectional view of a light guide display system 800, according to an embodiment of the present disclosure. The light guide display system 800 may be a part of a system (e.g., an NED, an HUD, an HMD, a smart phone, a laptop, or a television, etc.) for VR, AR, and/or MR applications. The light guide display system 800 may include image display components configured to project an image light (forming computer-generated virtual images) into a display window in a field of view ("FOV"). The light guide display system 800 may include one or more disclosed LCPH devices with the compensated wavy structures.

As shown in FIG. 7, the light guide display system 800 may include a light source assembly 805, a light guide 810, and a controller 817. The controller 817 may be configured to perform various controls, adjustments, or other functions or processes described herein. The light source assembly 805 may include a light source 820 and a light conditioning system 825. In some embodiments, the light source 820 may be a light source configured to generate a coherent or partially coherent light. The light source 820 may include, e.g., a laser diode, a vertical cavity surface emitting laser, a light emitting diode, or a combination thereof. In some embodiments, the light source 820 may be a display panel, such as a liquid crystal display ("LCD") panel, a liquid-crystal-on-silicon ("LCoS") display panel, an organic light-emitting diode ("OLED") display panel, a micro light-emitting diode ("micro-LED") display panel, a digital light processing ("DLP") display panel, a laser scanning display panel, or a combination thereof. In some embodiments, the light source 820 may be a self-emissive panel, such as an OLED display panel or a micro-LED display panel. In some embodiments, the light source 820 may be a display panel that is illuminated by an external source, such as an LCD panel, an LCoS display panel, or a DLP display panel. Examples of an external source may include a laser, an LED, an OLED, or a combination thereof. The light conditioning system 825 may include one or more optical components configured to condition the light from the light source 820. For example, the controller 817 may control the light conditioning system 825 to condition the light from the light source 820, which may include, e.g., transmitting, attenuating, expanding, collimating, and/or adjusting orientation of the light.

The light source assembly 805 may generate an image light 830 and output the image light 830 to an in-coupling element 835 disposed at a first portion of the light guide 810. The light guide 810 may receive the image light 830 at the in-coupling element 835 located at the first portion of the light guide 810. In some embodiments, the in-coupling element 835 may couple the image light 830 into a total internal reflection ("TIR") path inside the light guide 810. The image light 830 may propagate inside the light guide 810 through TIR along the TIR path, toward an out-coupling element 845 located at a second portion of the light guide 810. The first portion and the second portion may be located at different parts of the light guide 810. The out-coupling element 845 may be configured to couple the image light 830 out of the light guide 810. For example, the out-coupling element 845 may be configured to couple the image light 830 out of the light guide 810 as a plurality of image lights 832 propagation toward an eye-box region 855. In some embodiments, the light guide display system 800 may expand and direct the image light 830 to an exit pupil 857 positioned in the eye-box region 855 of the light guide display system 800. The exit pupil 857 may be a location where the eye 860 is positioned in the eye-box region 855.

The light guide 810 may include a first surface or side 810-1 facing the real-world environment and an opposing second surface or side 810-2 facing the eye-box region 860. Each of the in-coupling element 835 and the out-coupling element 845 may be disposed at the first surface 810-1 or the second surface 810-2 of the light guide 810. In some embodiments, as shown in FIG. 7, the in-coupling element 835 may be disposed at the second surface 810-2 of the light guide 810, and the out-coupling element 845 may be disposed at the first surface 810-1 of the light guide 810. In some embodiments, the in-coupling element 835 may be disposed at the first surface 810-1 of the light guide 810. In some embodiments, the out-coupling element 845 may be disposed at the second surface 810-2 of the light guide 810. In some embodiments, both of the in-coupling element 835 and the out-coupling element 845 may be disposed at the first surface 810-1 or the second surface 810-2 of the light guide 810. In some embodiments, the in-coupling element 835 or the out-coupling element 845 may be integrally formed as a part of the light guide 810 at the corresponding surface. In some embodiments, the in-coupling element 835 or the out-coupling element 845 may be separately formed, and may be disposed at (e.g., affixed to) the corresponding surface.

In some embodiments, each of the in-coupling element 835 and the out-coupling element 845 may have a designed operating wavelength band that includes at least a portion of the visible wavelength band. In some embodiments, the designed operating wavelength band of each of the in-coupling element 835 and the out-coupling element 845 may not include the IR wavelength band. For example, each of the in-coupling element 835 and the out-coupling element 845 may be configured to deflect a visible light, and transmit an IR light without a deflection or with negligible deflection.

In some embodiments, each of the in-coupling element 835 and the out-coupling element 845 may include one or more diffraction gratings, one or more cascaded reflectors, one or more prismatic surface elements, an array of holographic reflectors, or any combination thereof. In some embodiments, each of the in-coupling element 835 and the out-coupling element 845 may include one or more diffraction gratings, such as a surface relief grating, a volume hologram, a polarization selective grating, a polarization volume hologram ("PVH") grating, a metasurface grating, or any combination thereof. In some embodiments, a period of the diffraction grating included in the in-coupling element 835 may be configured to enable TIR of the image light 830 within the light guide 810. In some embodiments, a period of the diffraction grating included in the out-coupling element 845 may be configured to couple the image light 830 propagating inside the light guide 810 through TIR out of the light guide 810 via diffraction. In some embodiments, at least one of the in-coupling element 835 and the out-coupling element 845 may include one or more disclosed LCPH devices with the compensated wavy structures, such as the LCPH device 600 shown in FIG. 6A, or the LCPH device 680 shown in FIG. 6D.

The light guide 810 may include one or more materials configured to facilitate the total internal reflection of the image light 830. The light guide 810 may include, for example, a plastic, a glass, and/or polymers. The light guide 810 may have a relatively small form factor. The light guide 810 coupled with the in-coupling element 835 and the out-coupling element 845 may also function as an image combiner (e.g., AR or MR combiner). The light guide 810 may combine the image light 832 representing a virtual image and a light 834 from the real world environment (or a real world light 834), such that the virtual image may be superimposed with real-world images. With the light guide display system 800, the physical display and electronics may be moved to a side of a front body of an NED. A substantially fully unobstructed view of the real world environment may be achieved, which enhances the AR or MR user experience.

In some embodiments, the light guide 810 may include additional elements configured to redirect, fold, and/or expand the pupil of the light source assembly 805. For example, in some embodiments, the light guide display system 800 may include a redirecting element 840 coupled to the light guide 810, and configured to redirect the image light 830 to the out-coupling element 845, such that the image light 830 is coupled out of the light guide 810 via the out-coupling element 845. In some embodiments, the redirecting element 840 may be arranged at a location of the light guide 810 opposing the location of the out-coupling element 845. For example, in some embodiments, the redirecting element 840 may be integrally formed as a part of the light guide 810 at the corresponding surface. In some embodiments, the redirecting element 840 may be separately formed and disposed at, e.g., affixed to, the corresponding surface of the light guide 810.

In some embodiments, the redirecting element 840 and the out-coupling element 845 may have a similar structure. In some embodiments, the redirecting element 840 may include one or more diffraction gratings, one or more cascaded reflectors, one or more prismatic surface elements, an array of holographic reflectors, or any combination thereof. In some embodiments, the redirecting element may include one or more diffraction gratings, such as a surface relief grating, a volume hologram, a polarization selective grating, a polarization volume hologram, a metasurface grating, or any combination thereof. In some embodiments, the redirecting element 840 may include one or more disclosed LCPH devices with the compensated wavy structures, such as the LCPH device 600 shown in FIG. 6A, or the LCPH device 680 shown in FIG. 6D. In some embodiments, multiple functions, e.g., redirecting, folding, and/or expanding the pupil of the light generated by the light source assembly 805 may be combined into a single element, e.g., the out-coupling element 845.

In some embodiments, the light guide display system 800 may include a plurality of light guides 810 disposed in a stacked configuration (not shown in FIG. 7). At least one (e.g., each) of the plurality of light guides 810 may be coupled with or include one or more diffractive elements, including, for example, an in-coupling element, an out-coupling element, and/or a redirecting element. the one or more diffractive elements may be configured to direct the image light 830 toward the eye 860. In some embodiments, the plurality of light guides 810 disposed in the stacked configuration may be configured to output an expanded polychromatic image light or a full-color image light. In some embodiments, the light guide display system 800 may include one or more light source assemblies 805 and/or one or more light guides 810. In some embodiments, at least one (e.g., each) of the light source assemblies 805 may be configured to emit a monochromatic image light of a specific wavelength band corresponding to a primary color, e.g., red, green, or blue, and a predetermined FOV or a predetermined portion of an FOV.

In some embodiments, the light guide display system 800 may include three different light guides 810 configured to deliver component color images, e.g., primary color images, by in-coupling and subsequently out-coupling, e.g., red, green, and blue lights, respectively, in any suitable order. In some embodiments, the light guide display system 800 may include two different light guides configured to deliver component color images by in-coupling and subsequently out-coupling a combination of red and green lights, and a combination of green and blue lights, respectively, in any suitable order. In some embodiments, at least one (e.g., each) of the light source assemblies 805 may be configured to emit a polychromatic image light, e.g., a full-color image light. The relative positions of the eye 860 and the light source assembly 805 shown in FIG. 7 are for illustrative purposes. In some embodiments, the eye 860 and the light source assembly 805 may be disposed at different sides of the light guide 810.

Figure 8A:
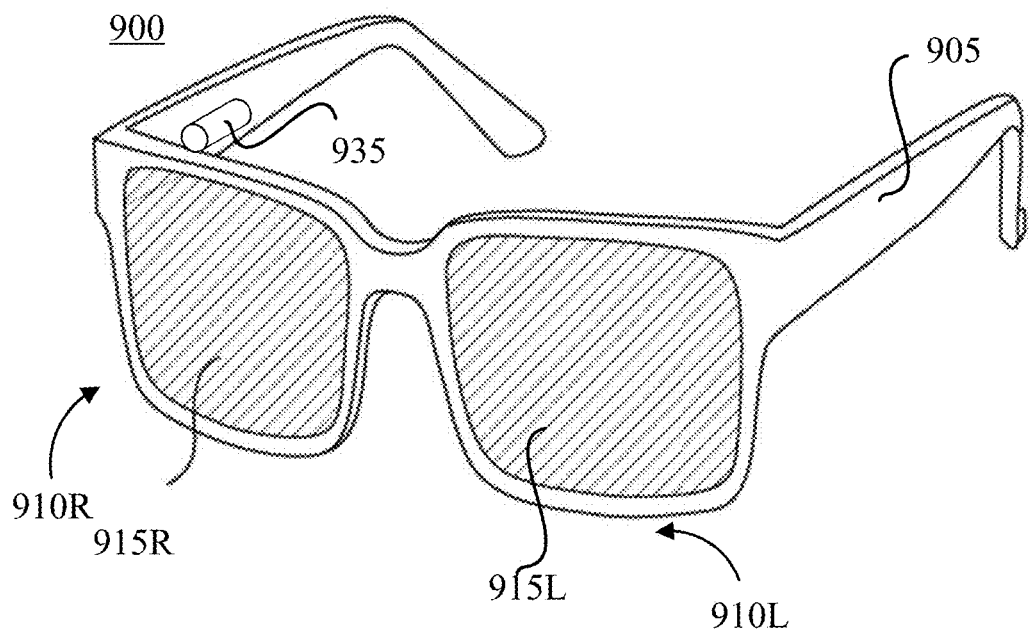
FIG. 8A illustrates a schematic diagram of a near-eye display ("NED"), according to an embodiment of the present disclosure.
Figure 8B:
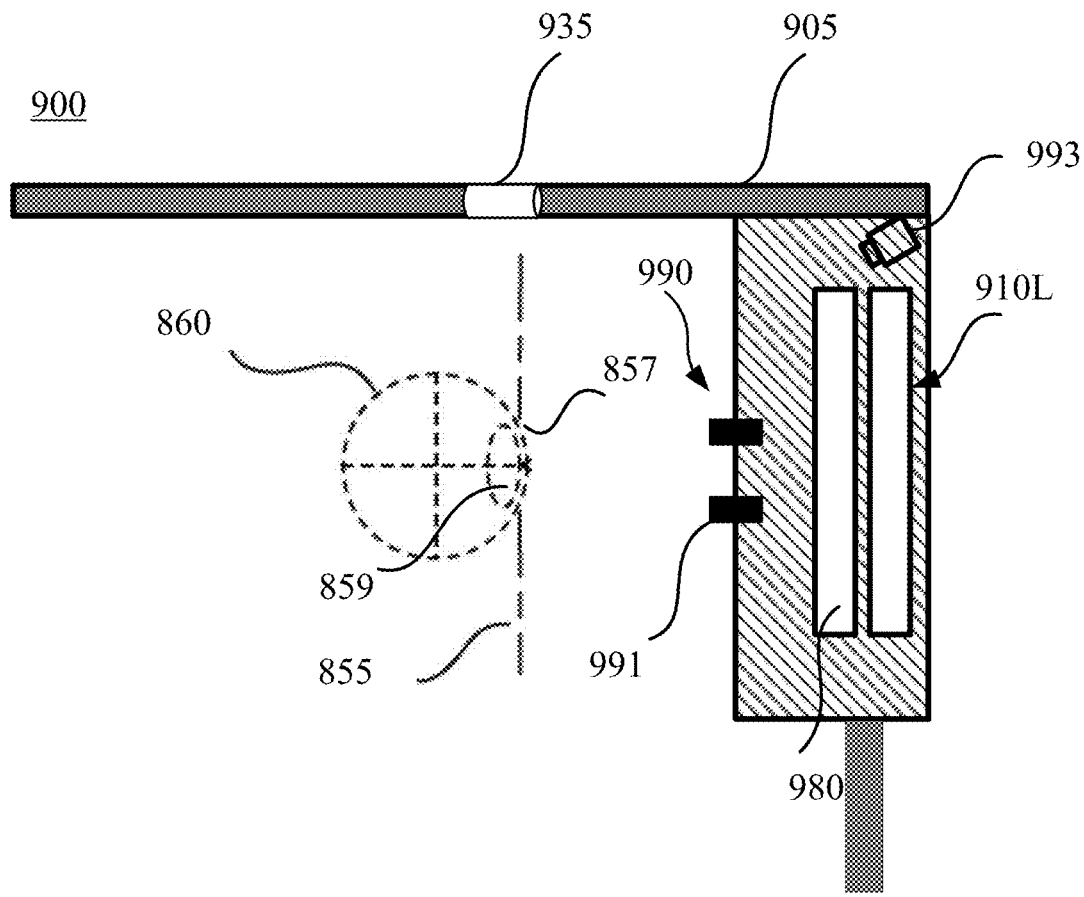
FIG. 8B illustrates a schematic cross sectional view of half of the NED shown in FIG. 8A, according to an embodiment of the present disclosure.

FIG. 8A illustrates a schematic diagram of a near-eye display ("NED") 900 according to an embodiment of the disclosure. FIG. 8B is a cross-sectional view of half of the NED 900 shown in FIG. 8A according to an embodiment of the disclosure. For purposes of illustration, FIG. 8B shows the cross-sectional view associated with a left-eye display system 910L. The NED 900 may include a controller (not shown). The NED 900 may include a frame 905 configured to mount to a user's head. The frame 905 is merely an example structure to which various components of the NED 900 may be mounted. Other suitable type of fixtures may be used in place of or in combination with the frame 905. The NED 900 may include right-eye and left-eye display systems 910R and 910L mounted to the frame 905. The NED 900 may function as a VR device, an AR device, an MR device, or any combination thereof. In some embodiments, when the NED 900 functions as an AR or an MR device, the right-eye and left-eye display systems 910R and 910L may be entirely or partially transparent from the perspective of the user, which may provide the user with a view of a surrounding real-world environment. In some embodiments, when the NED 900 functions as a VR device, the right-eye and left-eye display systems 910R and 910L may be opaque to block the light from the real-world environment, such that the user may be immersed in the VR imagery based on computer-generated images.

The left-eye and right-eye display systems 910L and 910R may include image display components configured to project computer-generated virtual images into left and right display windows 915L and 915R in a field of view ("FOV"). The left-eye and right-eye display systems 910L and 910R may be any suitable display systems. In some embodiments, the left-eye and right-eye display systems 910L and 910R may include one or more disclosed optical devices disclosed herein. In some embodiments, the left-eye and right-eye display systems 910L and 910R may include one or more optical systems (e.g., display systems) disclosed herein, such as the light guide display system 800 shown in FIG. 7. For illustrative purposes, FIG. 8A shows that the left-eye display systems 910L may include a light source assembly (e.g., a projector) 935 coupled to the frame 905 and configured to generate an image light representing a virtual image.

As shown in FIG. 8B, the left-eye display systems 910L may also include a viewing optical system 980 and an object tracking system 990 (e.g., eye tracking system and/or face tracking system). The viewing optical system 980 may be configured to guide the image light output from the left-eye display system 910L to the exit pupil 857. The exit pupil 857 may be a location where an eye pupil 859 of the eye 860 of the user is positioned in the eye-box region 855 of the left-eye display system 910L. For example, the viewing optical system 980 may include one or more optical elements configured to, e.g., correct aberrations in an image light output from the left-eye display systems 910L, magnify an image light output from the left-eye display systems 910L, or perform another type of optical adjustment of an image light output from the left-eye display systems 910L. Examples of the one or more optical elements may include an aperture, a Fresnel lens, a convex lens, a concave lens, a filter, any other suitable optical element that affects an image light, or a combination thereof. In some embodiments, the viewing optical system 980 may include one or more disclosed LCPH devices with the compensated wavy structures, such as the LCPH device 600 shown in FIG. 6.

The object tracking system 990 may include an IR light source 991 configured to illuminate the eye 860 and/or the face, and an optical sensor 993, such as a camera, configured to receive the IR light reflected by the eye 860 and generate a tracking signal relating to the eye 860. The tracking signal may be an image of the eye 860. In some embodiments, the object tracking system 990 may include one or more disclosed LCPH devices with the compensated wavy structures, such as the LCPH device 600 shown in FIG. 6A, or the LCPH device 680 shown in FIG. 6D. In some embodiments, the NED 900 may include an adaptive dimming element which may dynamically adjust the transmittance of lights reflected by real-world objects, thereby switching the NED 900 between a VR device and an AR device or between a VR device and an MR device. In some embodiments, along with switching between the AR/MR device and the VR device, the adaptive dimming element may be used in the AR and/MR device to mitigate differences in brightness of lights reflected by real-world objects and virtual image lights.

In some embodiments, a device is provided. The device includes a polarization hologram polymer layer having a wavy surface, an optic axis of the polarization hologram polymer layer being configured with a spatially varying orientation in a first predetermined in-plane direction. The device also includes a compensation layer disposed at the wavy surface of the polarization hologram polymer layer and configured to compensate for the wavy surface in shape. For example, the compensation layer may be disposed over the wavy surface to fill the valleys of the wavy surface and to render a substantially flat overall surface for the combined structure of the wavy surface and the compensation layer on top of the wavy surface. The optical film diffracts an input light to a primary diffracted light having a relatively high diffraction efficiency and a secondary diffracted light having a relatively low diffraction efficiency. With the compensation layer disposed over the wavy surface to render a substantially flat overall surface for the combined structure, the secondary diffracted light is suppressed.

The foregoing description of the embodiments of the disclosure have been presented for the purpose of illustration. It is not intended to be exhaustive or to limit the disclosure to the precise forms disclosed. Persons skilled in the relevant art can appreciate that modifications and variations are possible in light of the above disclosure.

Some portions of this description may describe the embodiments of the disclosure in terms of algorithms and symbolic representations of operations on information. These operations, while described functionally, computationally, or logically, may be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the disclosure may also relate to an apparatus for performing the operations herein. This apparatus may be specially constructed for the specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability. The processor may be a central processing unit ("CPU"), a graphics processing unit ("GPU"), or any processing device configured to process data and/or performing computation based on data. The processor may include both software and hardware components. For example, the processor may include a hardware component, such as an application-specific integrated circuit ("ASIC"), a programmable logic device ("PLD"), or a combination thereof. The PLD may be a complex programmable logic device ("CPLD"), a field-programmable gate array ("FPGA"), etc.

Embodiments of the disclosure may also relate to a product that is produced by a computing process described herein. Such a product may include information resulting from a computing process, where the information is stored on a non-transitory, tangible computer readable storage medium and may include any embodiment of a computer program product or other data combination described herein.

Further, when an embodiment illustrated in a drawing shows a single element, it is understood that the embodiment or another embodiment not shown in the figures but within the scope of the present disclosure may include a plurality of such elements. Likewise, when an embodiment illustrated in a drawing shows a plurality of such elements, it is understood that the embodiment or another embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A device, comprising:
a polarization hologram polymer layer having a wavy surface, an optic axis of the polarization hologram polymer layer being configured with a spatially varying orientation in a first predetermined in-plane direction; and
a compensation layer disposed at the wavy surface of the polarization hologram polymer layer and configured to compensate for the wavy surface in shape.

2. The device of claim 1, wherein
the polarization hologram polymer layer includes optically anisotropic molecules, orientation of the optically anisotropic molecules varying in the first predetermined in-plane direction, and
the wavy surface includes peaks and valleys alternately spaced in the first predetermined in-plane direction.

3. The device of claim 2, wherein
the peaks of the wavy surface correspond to first regions of the polarization hologram polymer layer in which the optically anisotropic molecules are substantially aligned in the first predetermined in-plane direction, and
the valleys of the wavy surface correspond to second regions of the polarization hologram polymer layer in which the optically anisotropic molecules are substantially aligned in a second predetermined in-plane direction that is perpendicular to the first predetermined in-plane direction.

4. The device of claim 1, wherein the compensation layer includes an optically clear adhesive.

5. The device of claim 1, wherein the polarization hologram polymer layer includes a liquid crystal polymer.

6. The device of claim 1, wherein the polarization hologram polymer layer includes a photo-sensitive polymer.

7. The device of claim 1, wherein the polarization hologram polymer layer includes an amorphous polymer.

8. The device of claim 1, wherein
an average refractive index of the polarization hologram polymer layer is $n_{p\text{-}average} = (n_e + n_o)/2$, $n_o$ and $n_e$ being an ordinary refractive index and an extraordinary refractive index of the polarization hologram polymer layer, respectively,
the compensation layer is an optically isotropic layer with refractive index of $n_c$, and
a difference between the refractive index $n_c$ and a refractive index $n_a$ of an outside environment of the device is less than a difference between the average refractive index $n_{p\text{-}average}$ and the refractive index $n_a$.

9. The device of claim 8, wherein the refractive index $n_c$ of the compensation layer is substantially the same as the average refractive index $n_{p\text{-}average}$ of the polarization hologram polymer layer.

10. The device of claim 1, wherein
an average refractive index of the polarization hologram polymer layer is $n_{p\text{-}average}$ $(n_e + n_o)/2$, $n_o$ and $n_e$ being an ordinary refractive index and an extraordinary refractive index of the polarization hologram polymer layer, respectively,
the compensation layer is an optically anisotropic layer, an average refractive index Ile-average of the compensation layer being $(n_x + n_y)/2$, $n_x$ and $n_y$ being principal refractive indices in orthogonal directions at a film plane of the compensation layer, and
a difference between the average refractive index $n_{c\text{-}average}$ and a refractive index $n_a$ of an outside environment of the device is less than a difference between the average refractive index $n_{p\text{-}average}$ and the refractive index $n_a$.

11. The device of claim 10, wherein the average refractive index $n_{c\text{-}average}$ of the compensation layer is substantially the same as the average refractive index $n_{p\text{-}average}$ of the polarization hologram polymer layer.

12. The device of claim 1, wherein the device is a Pancharatnam-Berry phase ("PBP") device or a polarization volume hologram ("PVH") device.

13. A method, comprising:
providing a polarization hologram polymer layer having a wavy surface and an optic axis configured with a spatially varying orientation in a first predetermined in-plane direction; and
forming a compensation layer over the wavy surface of the polarization hologram polymer layer to compensate for the wavy surface in shape.

14. The method of claim 13, wherein:
the polarization hologram polymer layer includes optically anisotropic molecules, orientations of the optically anisotropic molecules varying in the first predetermined in-plane direction,
the wavy surface includes peaks and valleys alternately spaced in the first predetermined in-plane direction,
the peaks correspond to first regions of the polarization hologram polymer layer in which the optically anisotropic molecules are substantially aligned in the first predetermined in-plane direction, and
the valleys correspond to second regions of the polarization hologram polymer layer in which the optically anisotropic molecules are substantially aligned in a second predetermined in-plane direction that is perpendicular to the first predetermined in-plane direction.

15. The method of claim 14, wherein forming the compensation layer over the wavy surface of the polarization hologram polymer layer further comprises:
- applying a liquid optically clear adhesive layer to the wavy surface of the polarization hologram polymer layer to fill the valleys to flatten the wavy surface; and
- curing the liquid optically clear adhesive layer to form the compensation layer.

16. The method of claim 13, wherein
- an average refractive index of the polarization hologram polymer layer is $n_{p\text{-}average}$ $(n_e+n_o)/2$, $n_o$ and $n_e$ being an ordinary refractive index and an extraordinary refractive index of the polarization hologram polymer layer, respectively,
- the compensation layer is an optically isotropic layer with a refractive index of $n_c$, and
- a difference between the refractive index $n_c$ and a refractive index $n_a$ of an outside environment of the device is less than a difference between the average refractive index $n_{p\text{-}average}$ and the refractive index $n_a$.

17. The method of claim 13, wherein the refractive index $n_c$ of the compensation layer is substantially the same as the average refractive index $n_{p\text{-}average}$ of the polarization hologram polymer layer.

18. A method, comprising:
- determining one or more relationships between an average height of a wavy surface of a testing polarization hologram polymer layer and one or more polymerization parameters, the testing polarization hologram polymer layer having an optic axis configured with a spatially varying orientation in a first predetermined in-plane direction;
- determining one or more values of the one or more polymerization parameters that render the average height of the wavy surface of the testing polarization hologram polymer layer to be a predetermined average height; and
- fabricating a final polarization hologram polymer layer using a polymerization process based on the determined one or more values of the one or more polymerization parameters, the fabricated final polarization hologram polymer layer having a wavy surface with the predetermined average height.

19. The method of claim 18, wherein in each of the testing polarization hologram polymer layer and the final polarization hologram polymer layer,
- optically anisotropic molecules are arranged with orientations varying in the first predetermined in-plane direction,
- the wavy surface includes peaks and valleys alternately spaced in the first predetermined in-plane direction,
- the peaks correspond to first regions in which the optically anisotropic molecules are substantially aligned in the first predetermined in-plane direction, and
- the valleys correspond to second regions in which the optically anisotropic molecules are substantially aligned in a second predetermined in-plane direction that is perpendicular to the first predetermined in-plane direction.

20. The method of claim 18, wherein the one or more polymerization parameters include a concentration of initiators in a birefringent medium, an exposure intensity, an exposure polarization, and an exposure temperature used in the polymerization process of the birefringent medium.

* * * * *